US012207058B2

(12) United States Patent
McClellan et al.

(10) Patent No.: US 12,207,058 B2
(45) Date of Patent: Jan. 21, 2025

(54) METHODS, SYSTEMS, APPARATUS, AND ARTICLES OF MANUFACTURE TO DETERMINE PERFORMANCE OF AUDIENCE MEASUREMENT METERS

(71) Applicant: The Nielsen Company (US), LLC, New York, NY (US)

(72) Inventors: Troy E. McClellan, Tampa, FL (US); James Joseph Vitt, Palm Harbor, FL (US); Douglas Brent Turnbow, Odessa, FL (US)

(73) Assignee: The Nielsen Co. (US) LLC, New York, NY (US)

( * ) Notice: Subject to any disclaimer, the term of this patent is extended or adjusted under 35 U.S.C. 154(b) by 201 days.

(21) Appl. No.: 17/957,878

(22) Filed: Sep. 30, 2022

(65) Prior Publication Data

US 2023/0209287 A1 Jun. 29, 2023

Related U.S. Application Data

(60) Provisional application No. 63/294,785, filed on Dec. 29, 2021.

(51) Int. Cl.
*H04R 29/00* (2006.01)
*G08B 21/18* (2006.01)
*G10L 19/018* (2013.01)
*G10L 25/51* (2013.01)

(52) U.S. Cl.
CPC ........... *H04R 29/00* (2013.01); *G08B 21/182* (2013.01); *G10L 19/018* (2013.01); *G10L 25/51* (2013.01)

(58) Field of Classification Search
CPC . G01M 13/028; H04H 20/12; H04H 2201/50; H04H 60/31; H04M 1/24; H04N 1/00002; H04N 1/00029; H04N 1/0005; H04N 1/00058; H04N 1/00061; H04N 1/00068; H04N 1/00079; H04R 29/00; H04R 29/001; H04R 29/007
USPC ................................................ 381/56–58, 60
See application file for complete search history.

(56) References Cited

U.S. PATENT DOCUMENTS

| | | | | |
|---|---|---|---|---|
| 7,549,099 | B2 * | 6/2009 | Kantake | G01R 31/2882 714/724 |
| 8,144,884 | B2 | 3/2012 | Van den Heuvel et al. | |
| 8,300,840 | B1 * | 10/2012 | Frye | H04R 29/00 381/313 |
| 11,102,596 | B2 * | 8/2021 | Osmanovic | H04R 3/00 |
| 2009/0169032 | A1 * | 7/2009 | Choi | H04S 7/301 381/94.1 |

(Continued)

*Primary Examiner* — Lun-See Lao

(57) ABSTRACT

Methods, apparatus, systems, and articles of manufacture are disclosed to determine performance of audience measurement meters. An example apparatus disclosed herein is to cause an audio output device of a meter to emit an audio signal into an environment, the audio signal based on a test pattern including a first plurality of watermarks and cause an audio input device of the meter to collect data from the environment during emission of the audio signal. Additionally, the example apparatus is to determine whether a second plurality of watermarks decoded from the data match the first plurality of watermarks and based on a difference between the first plurality of watermarks and the second plurality of watermarks indicative of a fault, cause an alert to be transmitted to a device associated with an audience measurement company that issued the meter.

20 Claims, 11 Drawing Sheets

(56) References Cited

U.S. PATENT DOCUMENTS

| | | | | |
|---|---|---|---|---|
| 2012/0310640 | A1 | 12/2012 | Kwatra et al. | |
| 2022/0342961 | A1* | 10/2022 | Dochow | G10L 19/018 |

* cited by examiner

METHODS, SYSTEMS, APPARATUS, AND ARTICLES OF MANUFACTURE TO DETERMINE PERFORMANCE OF AUDIENCE MEASUREMENT METERS

RELATED APPLICATION

This patent claims the benefit of U.S. Provisional Patent Application No. 63/294,785, which was filed on Dec. 29, 2021. U.S. Provisional Patent Application No. 63/294,785 is hereby incorporated herein by reference in its entirety. Priority to U.S. Provisional Patent Application No. 63/294,785 is hereby claimed.

FIELD OF THE DISCLOSURE

This disclosure relates generally to audience measurement and, more particularly, to methods, systems, apparatus, and articles of manufacture to determine performance of audience measurement meters.

BACKGROUND

Media monitoring companies monitor user interaction with media devices, such as smartphones, tablets, laptops, smart televisions, etc., and/or other metrics associated with media. To facilitate such monitoring, media monitoring companies enlist panelists and install meters at the media presentation locations of those panelists. Panelists may also be provided with portable meters that they can wear on their person. The meters monitor media presentations and transmit media monitoring information to a central facility of the media monitoring company. Such media monitoring information enables the media monitoring companies to, among other things, monitor exposure to advertisements, determine advertisement effectiveness, determine user behavior, identify purchasing behavior associated with various demographics, etc.

Figure 1:
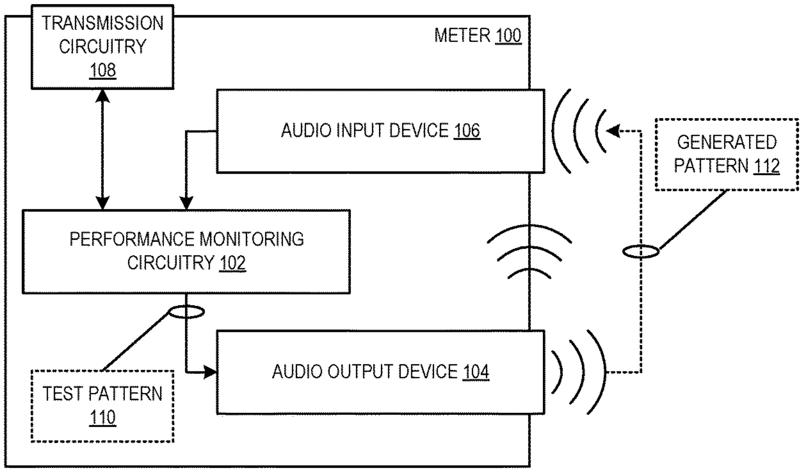
FIG. 1 is a block diagram of an example meter including example performance monitoring circuitry to evaluate the performance of the meter.

In general, the same reference numbers will be used throughout the drawing(s) and accompanying written description to refer to the same or like parts. The figures are not to scale. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general-purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

Metrics monitored by media monitoring companies include audience size and audience demographics. Determining the size and demographics of an audience (e.g., a television (TV) viewing audience) helps program (e.g., TV program) producers improve their programming (e.g., TV programming) and determine a price for advertising during such programming. In addition, accurate viewing demographics allow advertisers to target certain types and sizes of audiences.

To collect these demographics, a media monitoring company, sometimes referred to as an audience measurement company or audience measurement entity (AME), may enlist a plurality of viewers to cooperate in an audience measurement study for a predefined length of time. The viewing habits of these enlisted viewers as well as demographic data about these enlisted viewers is collected and used to statistically determine the size and demographics of a viewing audience. In some cases, automated measurement systems may be supplemented with survey information recorded manually by the viewing audience members.

The process of enlisting and retaining participants for purposes of audience measurement can be a difficult and costly aspect of the audience measurement process. For example, participants must be carefully selected and screened for particular characteristics so that the population of participants is representative of the overall viewing population. In addition, the participants must be willing to perform specific tasks that enable the collection of the data and, ideally, the participants selected must be diligent about performing these specific tasks so that the audience measurement data accurately reflects their viewing habits.

For example, audience measurement systems typically involve some amount of on-going input from the participating audience member. One method of collecting viewer input utilizes a people meter. A people meter is an electronic device that is typically disposed in the viewing area and that is proximate to one or more of the viewers. In some examples, the people meter is adapted to communicate with a television meter that monitors various signals associated with the television for a variety of purposes including, but not limited to, determining the operational status of the television, (e.g., whether the television is off or on), and identifying the programming being displayed by the television. For examples, the television meter may be disposed in, coupled to and/or in communication with the television, and/or otherwise structured to monitor media signal(s) output from the television and/or input to the television from one or more media source devices (e.g., a set top box, an over the top (OTT) device, a media player, a game console, etc.). Based on any number of triggers, including, for example a channel change or an elapsed period of time, the people meter prompts the household viewers to input information by depressing one of a set of buttons each of which is assigned to represent a different household member. For example, the people meter may prompt the viewers to register, (e.g., log in) or may prompt the viewers to indicate that they are still present in the viewing audience. Although periodically inputting information in response to a prompt may not be burdensome when required for an hour, a day or even a week or two, some participants find the prompting and data input tasks to be intrusive and annoying over longer periods of time.

In addition to performing tasks associated with viewing, some prior audience measurement techniques involve modifying participants' media systems to enable measurement of their viewing habits, which may involve allowing field personnel to gain access to their homes. Allowing access to the home can be viewed as intrusive by would-be participants and requires the would-be participant to schedule a time to allow such access. The would-be participant may also be unwilling to allow field personnel to modify their home media system.

Moreover, there are costs associated with engaging and training field personnel who not only install such audience measurement systems in the homes of participants but who also return to the homes on an as-needed basis to repair the equipment and to remove the equipment when the participants are either no longer willing to participate, have moved from their homes, or have reached the end of the term for which they originally agreed to participate.

To reduce the costs and resources required to enlist and retain participants and to engage and train field support, audience measurement companies are researching ways to make participation as convenient as possible for the participants and to minimize the amount of in-home installation/repair required to support in-home audience measurement.

Another aspect of audience measurement involves attempting to measure not only viewing that occurs within the home, referred to as in-home viewing, but also viewing that occurs outside of the home, referred to as out-of-home viewing. In today's world, the average viewer is frequently exposed to media sources outside the home. Specifically, televisions and display monitors are encountered in places such as airports, shopping centers, retail establishments, restaurants and bars, to name only a few locations.

To reduce costs and resources associated with audience measurement in general, and to facilitate measuring out-of-home television viewing, portable devices have been developed to (1) capture audio codes and/or audio watermarks embedded in and/or (2) generate signatures from the audio signals emanating from a television set and/or other media device. These watermarks and/or signatures are later transmitted to a central data processing facility which uses the watermarks and/or signatures to identify the programming that was viewed and to properly credit that viewing to the appropriate program. Because such devices are portable, they may be used to measure viewing that occurs both inside the home and outside the home.

There are characteristic differences between in-home television viewing and out-of-home television viewing that may be of interest to consumers of audience measurement data. Specifically, an in-home viewer often focuses much or all attention on the program being viewed. In contrast, out-of-home viewing may involve the focused attention of the viewer or may instead involve a brief glance at a screen as the viewer walks past a media presentation device located, for example, in an airport. In some examples, out-of-home viewing may involve a viewer focused on a program displayed on his mobile device (e.g., a laptop, a table, a mobile phone, etc.) during transit, for example. In addition, in-home viewing is typically performed on a selective basis (e.g., the viewer likely has control over the selection of programming displayed on an in-home media presentation device), whereas out-of-home viewing is less likely to be performed on a selective basis (e.g., the out-of-home viewer is less likely to have individual control over the selection of the programming being displayed on an out-of-home media presentation device, although out-of-home viewing on a mobile device is a caveat to this general trend). As described above, portable meters allow for monitoring of in-home and out-of-home viewing of media.

FIG. 1 is a block diagram of an example meter 100 including example performance monitoring circuitry 102 to evaluate the performance of the meter 100. The example meter 100 includes the example performance monitoring circuitry 102, an example audio output device 104, an example audio input device 106, and an example transmission circuitry 108. In the example of FIG. 1, the meter 100 is implemented by a portable meter. In additional or alternative examples, the meter 100 is implemented by one or more other types of meters such as an in-home meter that is disposed in a viewing area and associated with a media presentation device, such as a television.

In the illustrated example of FIG. 1, the performance monitoring circuitry 102 is communicatively coupled (e.g., electrically, optically, etc.) to the audio output device 104, the audio input device 106, and the transmission circuitry 108. In the example of FIG. 1, the performance monitoring circuitry 102 executes a test procedure to test the audio output device 104 and/or the audio input device 106. In the example of FIG. 1, the audio output device 104 is implemented by a speaker. In additional or alternative examples, the audio output device 104 is implemented by a piezoelectric buzzer, a magnetic buzzer, an electromagnetic buzzer, a mechanical buzzer, an electromechanical buzzer, and/or the like.

In the illustrated example of FIG. 1, the audio input device 106 is implemented by a microphone. In additional or alternative examples, the audio input device 106 is implemented by an audio sensor, a voice recognition system, and/or the like. In the example of FIG. 1, the transmission circuitry 108 is implemented by a transceiver capable of communicating with one or more networks, such as one or more wired networks, one or more wireless networks, etc. In additional or alternative examples, the transmission circuitry 108 is implemented by one or more transmitters and one or more receivers capable of communicating with the one or more networks.

In the illustrated example of FIG. 1, the performance monitoring circuitry 102 accesses and/or generates an audio test pattern and instructs or otherwise causes the audio output device 104 to output the example test pattern 110. In this manner, the performance monitoring circuitry 102 may cause the audio output device 104 to emit an acoustic signal (e.g., the test pattern 110) into the environment in which the meter 100 is disposed. In some examples, the test pattern 110 is implemented as a tone, a combination of overlapping tones, a sequence of tones of the same or varying durations, combinations thereof, etc. For example, one such tone may be in the frequency range that is producible by a transducer included in the audio output device 104 and/or detectable by a microphone included in the audio input device 106.

In some examples, the performance monitoring circuitry 102 generates the test pattern 110 as digital values, which are converted by circuitry associated with the audio output device 104 into an audio signal suitable for emission. For example, if the audio input device 106 monitors a bandwidth of 0 to 8 kilohertz (kHZ), then the performance monitoring circuitry 102 may cause the audio output device 104 to output a test pattern 110 including a tone with a frequency of 4 kHz and/or some other frequency in the band monitored by the audio input device 106. In additional or alternative examples, the test pattern 110 is implemented by a sweep of tones.

In some examples, the performance monitoring circuitry 102 causes the audio output device 104 to output the test pattern 110 based on a file. For example, the contents of the file may define an audio signal that includes a set of audio watermarks (e.g., with each watermark formed by a combination of one or more concurrent audio tones having a same duration but occurring at one or more different frequencies) and the performance monitoring circuitry 102 may cause the audio output device 104 to output the test pattern 110 as the audio signal including the set of audio watermarks (e.g., the contents of the file). In such examples, the performance monitoring circuitry 102 processes the data collected by the audio input device 106 to determine whether any (e.g., one or more) of the watermarks in the set are missing.

In the illustrated example of FIG. 1, if the performance monitoring circuitry 102 fails to detect one or more watermarks of the set of watermarks, the performance monitoring circuitry 102 can indicate that the meter 100 is operating unexpectedly. For example, the performance monitoring circuitry 102 can cause the transmission circuitry 108 to transmit an alert to a device associated with an audience measurement company that issued the meter 100. In some examples, the set of watermarks includes watermarks transmitted at different frequencies at specified times. In this manner, a set of watermarks may include a first watermark to detect a first type of fault (e.g., error) and a second watermark to detect a second type of fault (e.g., error).

In examples disclosed herein, faults include at least one of (a) a defect in at least one of the audio input device or the audio output device or (b) an obstruction of the at least one of the audio input device or the audio output device. In some examples, faults may be frequency dependent. For example, if a channel from the audio output device 104 and/or a channel to the audio input device 106 is obstructed by lint, a first frequency may not be successfully emitted and/or detected. Additionally or alternatively, if the channel from the audio output device 104 and/or the channel to the audio input device 106 is obstructed by water, a second frequency different from the first frequency may not be successfully emitted and/or detected. By including watermarks having different frequencies at different times in the test pattern 110, the performance monitoring circuitry 102 can detect different types of faults associated with the meter 100.

In the illustrated example of FIG. 1, the performance monitoring circuitry 102 reads an audio signal detected by the audio input device 106 while the performance monitoring circuitry 102 is causing the audio output device 104 to output the test pattern 110. In the example of FIG. 1, the performance monitoring circuitry 102 generates a frequency representation of data collected by the audio input device 106. For example, the performance monitoring circuitry 102 executes a Fast Fourier Transform (FFT) on data collected by the audio input device 106 (possibly after audio sampling, amplification, etc., and which may or may not accurately reflect the test pattern 110 and/or a corresponding generated pattern 112 produced by the audio output device 104). In this manner, the performance monitoring circuitry 102 determines the frequency content (e.g., in which frequency bins the energy of the signal is concentrated) of the data collected by the audio input device 106.

In the illustrated example of FIG. 1, the performance monitoring circuitry 102 compares frequency representation (e.g., the FFT) of the data collected by the audio input device 106 to a frequency representation of the test pattern 110. For example, the performance monitoring circuitry 102 determines a metric of error (e.g., percent error, means squared error, etc.) between the frequency representation of the data collected by the audio input device 106 and the frequency representation of the test pattern 110. If the performance monitoring circuitry 102 determines that the metric of error satisfies a threshold, the example performance monitoring circuitry 102 can detect that the audio output device 104 and/or the audio input device 106 are performing unexpectedly. In the example of FIG. 1, the audio input device 106 is implemented by a microphone. In such an example, if a channel of the microphone is obstructed (e.g., filled (partially or completely) with water and/or another fluid, lint, etc.), the microphone may not accurately detect the test pattern 110. In additional or alternative examples, the audio output device 104 may be defective and/or obstructed (e.g., by water and/or other fluid, lint, etc.). In such an example, the generated pattern 112 may not match the test pattern 110 provided to the audio output device 104 by the performance monitoring circuitry 102.

In some examples, as described above, the performance monitoring circuitry 102 determines whether one or more watermarks included in the test pattern 110 are present in the data collected by the audio input device 106. For example, the performance monitoring circuitry 102 processes the data collected by the audio input device 106 with a decoder to determine a group of one or more watermarks encoded in the signal captured by the audio input device 106. The performance monitoring circuitry 102 compares the decoded group of watermarks to the encoded group of watermarks included in the test pattern 110 to determine whether the encoded group of watermarks matches the decoded group of watermarks.

For example, a group of watermarks may be represented as a vector of binary values where each element of the vector corresponds to a frequency bin of an audio signal. In this manner, elements of the vector can be set to "1" to indicate the presence of a watermark in the corresponding frequency bin(s) of the audio signal. Thus, the performance monitoring circuitry 102 can determine that the decoded group of watermarks matches the encoded group of watermarks if the vector representative of the decoded group of watermarks is identical to the vector representative of the encoded group of watermarks. If the performance monitoring circuitry 102 determines that the decoded group of watermarks matches the encoded group of watermarks, the performance monitoring circuitry 102 causes the transmission circuitry 108 to transmit an alert to another device.

The ability to detect when the audio output device 104 and/or the audio input device 106 are performing unexpectedly provides improvements to the computational efficiency of the meter 100 and accuracy of the audience measurement conducted by the audience measurement company. For example, if a panelist drops the meter 100 into water, the panelist may return the meter 100 to the audience measurement company that issued the meter 100 without disclosing that the meter 100 was dropped in water. As such, by implementing the above-described procedure via the performance monitoring circuitry 102, the audience measurement company can proactively identify meters that are defective so as not to redistribute (e.g., to the same panelist and/or other panelists) meters that are malfunctioning and/or otherwise operating unexpectedly.

Additionally or alternatively, a housing of the meter 100 may conduct certain acoustic frequencies. As such, by implementing the above-described procedure via the performance monitoring circuitry 102, the audience measurement company can determine one or more resonant frequencies of the meter 100. For example, the performance monitoring circuitry 102 determines one or more resonant frequencies of the meter 100 prior to deployment of the meter 100 (e.g., when the meter 100 is presumed to be undamaged). Accordingly, the performance monitoring circuitry 102 can determine one or more signatures (e.g., one or more resonant frequencies) of the meter 100. Each housing (e.g., package, case, etc.) of a meter may have a unique sound signature.

In some examples, before determining one or more resonant frequencies of the meter 100, the performance monitoring circuitry 102 can determine if the meter 100 was manufactured correctly (e.g., as expected). For example, the performance monitoring circuitry 102 may instruct the audio output device 104 to transmit the test pattern 110 at a first frequency (e.g., 700 Hz) and then, when processing data collected by the audio input device 106, search for a second frequency (e.g., 2 kHz). In such an example, the second frequency may be indicative of a manufacturing error. The second frequency may be determined by manually inducing candidate errors (manufacturing and/or otherwise) and observing how the resonant frequencies of the meter 100 change. In this manner, frequency characteristics of candidate errors of the audio output device 104 and/or the audio input device 106 may be determined ahead of time so that the performance monitoring circuitry 102 can determine the type of error occurring at a later time.

For example, if at a later time, the resonant frequencies of the meter 100 do not match (e.g., within a threshold of) the predetermined resonant frequencies of the meter 100, such change(s) in resonant frequency indicate that the housing of the meter 100 may be cracked, items (e.g., screws) within the meter 100 may be loose, the housing of the meter 100 may be breached, or the like. Such resonant frequency analysis by the performance monitoring circuitry 102 can allow the audience measurement company to determine if a panelist has tampered with the meter 100 (e.g., a panelist opened the meter 100, a panelist drilled into the housing of the meter 100 to attach a wire, an electronic bug (e.g., monitoring device), etc.).

In some examples, the performance monitoring circuitry 102 may execute the above-described (e.g., self-diagnostic) procedure when the meter 100 is connected to a charger. For example, when connected to a charger, a sound port of the meter 100 (e.g., a port through which the audio output device 104 transmits the generated pattern 112) may be exposed (e.g., open and passes through the charger without reflecting off the charger). The charger may also be elevated on legs to reduce vibrations passing into a surface on which the charger is disposed. In this manner, despite the meter 100 charging, the performance monitoring circuitry 102 can execute the self-diagnostic procedure. As charging is expected to happen daily, the performance monitoring circuitry 102 can ensure proper operation of the meter 100 daily and collect diagnostics to monitor long-term performance of the meter 100.

In some examples, the meter 100 may include an additional audio output device and/or an additional audio input device. In such examples, the presence of an additional audio output device and/or an additional audio input device allows the performance monitoring circuitry 102 to distinguish between a malfunction and/or otherwise unexpected performance of the audio output device 104 and/or the audio input device 106. If the meter 100 includes a single audio output device and a single audio input device, the performance monitoring circuitry 102 can distinguish between errors in the audio output device 104 and errors in the audio input device 106 in some examples. For example, if no audio is detected by the audio input device 106, the performance monitoring circuitry 102 identifies the audio input device 106 as defective. Additionally, for example, if only ambient noise is collected by the audio input device 106, the performance monitoring circuitry 102 identifies the audio output device 104 as defective. For example, a developer of the meter 100 may preload the meter 100 with an ambient noise threshold developed based on recordings of ambient noise with the meter 100. In such examples, if the performance monitoring circuitry 102 determines that the audio collected by the meter 100 does not satisfy (e.g., is less than, less than or equal to, etc.) the ambient noise threshold, the performance monitoring circuitry 102 identifies the audio output device 104 as defective. Additionally or alternatively, if the performance monitoring circuitry 102 instructs the audio output device 104 to generate a 2 kHz tone and determines that the audio input device 106 detected a 1 kHz tone, the performance monitoring circuitry 102 identifies the audio output device 104 as defective. Such a difference between the test pattern 110 and the generated pattern 112 may be indicative of swelling in a battery of the meter 100 where the swelling increases the size of the housing of the meter 100 thereby creating new frequency spectra.

In examples disclosed herein, after detecting unexpected behavior of the audio output device 104 and/or the audio input device 106, the performance monitoring circuitry 102 can cause the transmission circuitry 108 (e.g., a transmitter, a transceiver, etc.) to transmit a signal to cause an action to be performed with respect to the meter 100. For example, during manufacture of the meter 100, if the performance monitoring circuitry 102 detects unexpected behavior, the performance monitoring circuitry 102 can cause the transmission circuitry 108 to transmit a signal to a robot (e.g., a robot on an assembly line) to cause removal of the meter 100 from an assembly line for repair and/or disposal. By providing such alerts, the performance monitoring circuitry 102 can ensure that meters that are deployed operate as expected.

In additional or alternative examples, after deployment, if the performance monitoring circuitry 102 detects unexpected behavior, the performance monitoring circuitry 102 can cause the transmission circuitry 108 to transmit a signal to a computer (e.g., a mobile device of a panelist including an application to monitor the meter 100, a computer operated by the audience measurement company that issued the meter 100, etc.) indicating that the meter 100 is operating unexpectedly and that service of the meter 100 may be required. In such an example, a panelist associated with the meter 100 may mail the meter 100 back to the audience measurement company that issued the meter 100 and/or personnel of the audience measurement company may collect the meter 100 from the panelist for repair and/or disposal. In some examples, if the performance monitoring circuitry 102 detects unexpected behavior, the performance monitoring circuitry 102 can cause the transmission circuitry 108 to transmit a signal to a computer (e.g., a computer operated by the audience measurement company that issued the meter 100) indicating that the audience measurement company should disregard monitoring data reported by the meter 100 because the meter 100 is potentially defective. In this manner, the performance monitoring circuitry 102 can ensure that deployed meters that are operating as expected.

Figure 2:
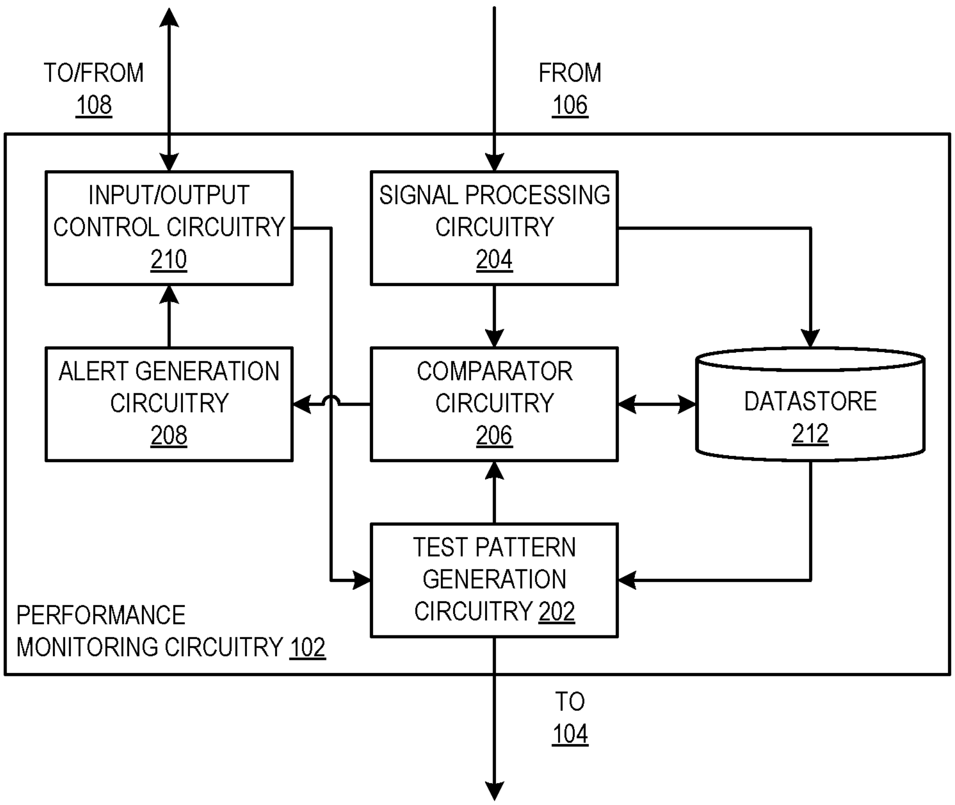
FIG. 2 is a block diagram of the example performance monitoring circuitry of FIG. 1.

FIG. 2 is a block diagram of the example performance monitoring circuitry 102 of FIG. 1. The performance monitoring circuitry 102 of FIG. 2 may be instantiated (e.g., creating an instance of, bring into being for any length of time, materialize, implement, etc.) by processor circuitry such as a central processing unit executing instructions. Additionally or alternatively, the performance monitoring circuitry 102 of FIG. 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by microprocessor circuitry executing instructions to implement one or more virtual machines and/or containers.

In the illustrated example of FIG. 2, the performance monitoring circuitry 102 includes example test pattern generation circuitry 202, example signal processing circuitry 204, example comparator circuitry 206, example alert generation circuitry 208, example input/output (I/O) control circuitry 210, and an example datastore 212. In the example of FIG. 2, the test pattern generation circuitry 202 is coupled to or otherwise in communication with the audio output device 104 of FIG. 1, the comparator circuitry 206, the I/O control circuitry 210, and the datastore 212. The example test pattern generation circuitry 202 causes the audio output device 104 to emit an audio signal based on the test pattern 110 into an environment in which the meter 100 is disposed. In some examples, the test pattern generation circuitry 202 accesses data from the datastore 212 to determine one or more signals to include in the test pattern 110. In additional or alternative examples, the test pattern generation circuitry 202 receives instructions regarding the one or more signals to include in the test pattern 110 via the I/O control circuitry 210.

In the illustrated example of FIG. 2, depending on the self-diagnostic test to be executed by the performance monitoring circuitry 102 is to run, the test pattern generation circuitry 202 selects different signals to include in the test pattern 110. For example, if the performance monitoring circuitry 102 is to execute a test to determine if there is a fault present in one or more of the audio output device 104 or the audio input device 106, the test pattern generation circuitry 202 generates a test pattern including one or more tones or a plurality of watermarks. Other test patterns may be used to determine if there is a fault present in one or more of the audio output device 104 or the audio input device 106.

Additionally or alternatively, if the performance monitoring circuitry 102 is to execute a test to determine if there is a fault present in a housing of the meter 100 or otherwise associated with the physical integrity of the meter 100, the test pattern generation circuitry 202 generates a test pattern including a sweep of tones. In this manner, the audio signal emitted by the audio output device 104 will allow the performance monitoring circuitry 102 to determine the frequency response of the meter 100. Other test patterns may be used to determine if there is a fault present in a housing of the meter 100 or otherwise associated with the physical integrity of the meter 100. In some examples, the test pattern generation circuitry 202 is instantiated by processor circuitry executing test pattern generation instructions and/or configured to perform operations such as those represented by the flowcharts of FIGS. 3, 4, 5, 6, and/or 7.

In the illustrated example of FIG. 2, the signal processing circuitry 204 is coupled to or otherwise in communication with the audio input device 106 of FIG. 1, the comparator circuitry 206, and the datastore 212. The example signal processing circuitry 204 processes data received from the audio input device 106 during the self-diagnostic test. For example, while the audio output device 104 emits the audio signal (e.g., during emission of the audio signal), the signal processing circuitry 204 causes the audio input device 106 to collect data from the environment in which the meter 100 is disposed.

In the illustrated example of FIG. 2, depending on the self-diagnostic test to be executed by the performance monitoring circuitry 102, the signal processing circuitry 204 processes the data collected by the audio input device 106 differently. In examples where the test pattern 110 is to include a first plurality of watermarks, the signal processing circuitry 204 decodes the data to generate a second plurality of watermarks. For example, the signal processing circuitry 204 populates a vector representative of the frequency bins of an audio signal collected by the audio input device 106 based on the magnitude of frequency content in the frequency bins. For example, if the magnitude of the frequency content of a bin satisfies (e.g., meets, exceeds, etc.) a threshold, then the signal processing circuitry 204 populates an element of the vector corresponding to the bin with a "1." Alternatively, if the magnitude of the frequency content of a bin does not satisfy the threshold, then the signal processing circuitry 204 populates an element of the vector corresponding to the bin with a "0."

In additional or alternative examples, the signal processing circuitry 204 generates a frequency representation of the data collected from the environment. For example, the signal processing circuitry 204 generates an FFT of the data collected from the environment. In some examples, the signal processing circuitry 204 determines a frequency response of the meter 100 based of the frequency representation of the data.

For example, prior to deployment of the meter 100 (e.g., when the meter 100 is presumed undamaged), the test pattern generation circuitry 202 causes the audio output device 104 to emit an audio signal into the environment and the signal processing circuitry 204 causes the audio input device 106 to collect data from the environment. The signal processing circuitry 204 generates a frequency representation of the data and determines an undamaged frequency response of the meter 100 based on the frequency representation of the data. The undamaged frequency response is also referred to as a baseline frequency response of the meter 100. In such examples, the signal processing circuitry 204 causes storage of the undamaged frequency response of the meter 100 including an undamaged resonant frequency of the meter 100 (e.g., a case of the meter 100) in the datastore 212. The undamaged resonant frequency is also referred to as a baseline resonant frequency of the meter 100. In some examples, the signal processing circuitry 204 causes storage of the undamaged frequency response of the meter 100 and the undamaged resonant frequency at a remote storage device.

Additionally or alternatively, an entity associated with the audience measurement company that issued the meter 100 may manually induce a fault in the meter 100 or a meter of the same model as the meter 100. In this manner, the meter 100 can determine one or more candidate fault frequency responses. The manually induced fault may correspond to a fault that may occur when the meter 100 is deployed. Example candidate faults include the housing of the meter 100 being cracked, items (e.g., screws) within the meter 100 being loose, the housing of the meter 100 being breached (e.g., due to a panelist tampering with (e.g., opening, drilling into, etc.) the meter 100), among others.

In such examples, the test pattern generation circuitry 202 causes the audio output device 104 to emit an audio signal into the environment and the signal processing circuitry 204 causes the audio input device 106 to collect data from the environment. For example, the test pattern generation circuitry 202 instructs the audio output device 104 to emit an audio signal based on the same test pattern that was used to determine the undamaged frequency response. The signal processing circuitry 204 also generates a frequency representation of the data, which is used as or forms the basis of a candidate fault frequency response of the meter 100 that corresponds to the induced fault. In such examples, the signal processing circuitry 204 causes storage of the candidate fault frequency response of the meter 100, which may also include a candidate fault resonant frequency of the meter 100 (e.g., a case of the meter 100) corresponding to the induced fault, in the datastore 212. In some examples, the signal processing circuitry 204 causes storage of the candidate fault frequency response of the meter 100 and the candidate fault resonant frequency at a remote storage device.

In the illustrated example of FIG. 2, during deployment of the meter 100, the signal processing circuitry 204 can determine a deployed frequency response of the meter 100 including a deployed resonant frequency. In this manner, the comparator circuitry 206 can compare the deployed frequency response of the meter 100 to the undamaged frequency response of the meter 100 and/or the one or more candidate fault frequency responses corresponding to the one or more respective induced faults. Additionally or alternatively, the comparator circuitry 206 can compare the deployed resonant frequency of the meter 100 to the undamaged resonant frequency of the meter 100 and/or the one or more candidate fault resonant frequencies corresponding to the one or more respective induced faults.

In this manner, the comparator circuitry 206 can determine whether a frequency is present in the data collected by the audio input device 106, the frequency predetermined based on analysis of the same (or similar) meter that included a manually induced version of the fault. In some examples, the signal processing circuitry 204 is instantiated by processor circuitry executing signal processing instructions and/or configured to perform operations such as those represented by the flowcharts of FIGS. 3, 4, 5, 6, and/or 7.

In the illustrated example of FIG. 2, the comparator circuitry 206 is coupled to or otherwise in communication with the test pattern generation circuitry 202, the signal processing circuitry 204, the alert generation circuitry 208, and the datastore 212. In some examples, the comparator circuitry 206 compares a first plurality of watermarks decoded from data collected by the audio input device 106 with a second plurality of watermarks included in the test pattern 110. For example, the comparator circuitry 206 compares a first binary vector representative of the first plurality of watermarks to a second binary vector representative of the second plurality. In the example of FIG. 2, if one or more of the elements of the first binary vector do not equal one or more corresponding elements of the second binary vector, the comparator circuitry 206 determines that the first plurality of watermarks does not match the second plurality of watermarks.

In the illustrated example of FIG. 2, in response to determining that the plurality of watermarks decoded from the data collected by the audio input device 106 does not match the plurality of watermarks included in the test pattern

110, the comparator circuitry 206 increments a variable indicative of a fault associated with watermark detection. For example, such a variable, which may also be referred to as a watermark fault variable or a first fault variable, can be used to count the number of times the meter 100 failed a test of the ability to detect one or more watermarks. The watermark fault variable may be stored in the datastore 212.

In some examples, the comparator circuitry 206 records data indicative of differences between the first plurality of watermarks and the second plurality of watermarks in the datastore 212. For example, if the test pattern 110 (e.g., the second plurality of watermarks) includes a first watermark to be emitted at a first frequency at a first time and a second watermark to be emitted at a second frequency at a second time and the first plurality of watermarks decoded from the collected data indicates that only the first watermark was detected by the audio input device 106 (e.g., the frequency bins of the audio signal collected by the audio input device 106 include frequency content at the first frequency, but not the second frequency), then the comparator circuitry 206 records data to reflect that the second watermark at the second frequency was not detected by the audio input device 106. In this manner, the data may be used at a later time to diagnose (e.g., ascertain) the type of fault that may be present in the meter 100.

In additional or alternative examples, the comparator circuitry 206 compares a frequency representation of the data collected by the audio input device 106 from the environment to a frequency representation of the test pattern 110. For example, the comparator circuitry 206 determines a metric of error between the frequency representation of the data collected by the audio input device 106 from the environment and the frequency representation of the test pattern 110. The metric of error may be mean squared error, percent error, among others. In such examples, the comparator circuitry 206 determines whether the metric of error satisfies a first threshold. For example, the first threshold may be tuned by a developer of the performance monitoring circuitry 102 such that when the metric of error satisfies the first threshold data collected by the meter 100 can be considered reliable.

In the illustrated example of FIG. 2, in response to determining that the metric of error does not satisfy the first threshold of (e.g., exceeds the first threshold by more than 10%), the comparator circuitry 206 increments a variable indicative of a fault associated with signal quality of the meter 100. For example, such a variable, which may also be referred to as a signal quality fault variable or a second fault variable, can be used to count the number of times a test of the meter 100 yielded a deployed frequency response that failed to match the baseline frequency response within the first threshold. The signal quality variable may be stored in the datastore 212.

In some examples, the comparator circuitry 206 records data indicative of differences between the frequency representation of the data and the frequency representation of the test pattern 110 in the datastore 212. For example, if the test pattern 110 includes a 2 kHz tone and the data collected by the audio input device 106 indicates that the detected audio signal includes a 1 kHz tone, the comparator circuitry 206 records the difference in the frequency of the tone transmitted in the test pattern 110. In this manner, the data may be used at a later time to diagnose (e.g., ascertain) the type of fault that may be present in the meter 100.

In the illustrated example of FIG. 2, the comparator circuitry 206 also determines whether one or more variables indicative of a fault satisfies one or more second thresholds. For example, the comparator circuitry 206 determines whether the watermark fault variable satisfies a second threshold associated with watermark faults (e.g., a watermark fault count threshold). Additionally or alternatively, the comparator circuitry 206 determines whether the signal quality fault variable satisfies a second threshold associated with signal quality faults (e.g., a signal quality fault count threshold). For example, the one or more second thresholds may be tuned by a developer of the performance monitoring circuitry 102 such that satisfaction of the one or more second thresholds indicate that a fault is persistently present in the meter 100 (e.g., the fault has persisted over a long period of time affecting the long-term performance of the meter 100).

In the illustrated example of FIG. 2, in response to the comparator circuitry 206 determining that one or more variables indicative of a fault satisfy one or more of the second thresholds, the comparator circuitry 206 determines one or more candidates for the fault based on the data indicative of the differences between the frequency representation of the data collected by the audio input device 106 and the frequency representation the test pattern 110. For example, if the recorded data indicative of the differences indicates that the test pattern 110 was to be transmitted at a 2 kHz tone and the data collected by the audio input device 106 indicates that the detected audio signal includes a 1 kHz tone, the comparator circuitry 206 identifies a candidate fault associated with swelling in a battery of the meter 100. For example, such swelling increases the size of the housing of the meter 100 thereby creating new frequency spectra.

In additional or alternative examples, the comparator circuitry 206 compares the deployed resonant frequency of the meter 100 to the undamaged resonant frequency of the meter 100. In such examples, the comparator circuitry 206 determines whether the deployed resonant frequency of the meter 100 is within a threshold of the undamaged resonant frequency of the meter 100. For example, the threshold may be tuned by a developer of the performance monitoring circuitry 102 such that when the deployed resonant frequency of the meter 100 is within the threshold of the undamaged resonant frequency of the meter 100 the meter 100 can be considered to not have any structural faults. In such examples, the threshold may be referred to as a structural integrity threshold.

In the illustrated example of FIG. 2, in response to determining that the deployed resonant frequency of the meter 100 is not within the structural integrity threshold (e.g., 10%) of the undamaged resonant frequency of the meter 100, the comparator circuitry 206 increments a variable indicative of a fault (which may be referred to as a structural fault variable or a third fault variable). The structural fault variable may be stored in the datastore 212. In the example of FIG. 2, the comparator circuitry 206 also determines whether the structural fault variable satisfies a second threshold associated with structural faults (e.g., a structural fault count threshold). In response to the comparator circuitry 206 determining that the variable indicative of the fault satisfies the structural fault count threshold, the comparator circuitry 206 identifies one or more candidates for the fault by comparing the deployed resonant frequency to one or more candidate fault frequency responses. In some examples, the comparator circuitry 206 is instantiated by processor circuitry executing comparator instructions and/or configured to perform operations such as those represented by the flowcharts of FIGS. 5, 6, and/or 7.

In the illustrated example of FIG. 2, the alert generation circuitry 208 is coupled to or otherwise in communication with the comparator circuitry 206 and the I/O control circuitry 210. In the example of FIG. 2, the alert generation circuitry 208 generates an alert indicative of the one or more candidates for a fault that may be present in the meter 100. For example, the alert generation circuitry 208 may specify the one or more candidates for a fault identified by the comparator circuitry 206 as well as respective likelihoods that each candidate fault is present in the meter 100. In some examples, the alert generation circuitry 208 specifies that a candidate fault may be present and reports the respective likelihoods that each candidate fault is present without identifying the candidate as any particular fault. In additional or alternative examples, the alert generation circuitry 208 specifies that a candidate fault has been detected and identifies the candidate fault as the candidate having the highest likelihood. In some examples, the alert generation circuitry 208 is instantiated by processor circuitry executing alert generation instructions and/or configured to perform operations such as those represented by the flowcharts of FIGS. 5, 6, and/or 7.

In the illustrated example of FIG. 2, the alert generation circuitry 208 is coupled to or otherwise in communication with the transmission circuitry 108 of FIG. 1, the test pattern generation circuitry 202, and the alert generation circuitry 208. In the example of FIG. 2, the I/O control circuitry 210 causes the transmission circuitry 108 to transmit the alert to a device associated with the audience measurement company that issued the meter 100. In some examples, the device associated with the audience measurement entity is a panelist's device (e.g., a mobile phone, personal computer, etc.). In additional or alternative examples, the device associated with the audience measurement entity is a computer, data center, cloud resource, etc., owned by, operated by, or leased by the audience measurement company. In some examples, the I/O control circuitry 210 forwards instructions regarding one or more signals to include in the test pattern 110 to the test pattern generation circuitry 202. In some examples, the I/O control circuitry 210 is instantiated by processor circuitry executing I/O control instructions and/or configured to perform operations such as those represented by the flowcharts of FIGS. 5, 6, and/or 7.

In the illustrated example of FIG. 2, the datastore 212 is configured to store data. For example, the datastore 212 can store one or more files indicative of one or more test patterns, the undamaged frequency response of the meter 100 including the undamaged resonant frequency of the meter 100 (e.g., a housing of the meter 100), one or more candidate fault frequency responses of the meter 100 including one or more candidate fault resonant frequencies of the meter 100 (e.g., a case of the meter 100), one or more variables indicative of one or more corresponding faults (e.g., watermark faults, signal quality faults, structural faults, etc.), data indicative of differences between one or more decoded watermarks and one or more encoded watermarks included in test patterns, data indicative of differences between one or more frequency representations of collected data and one or more frequency representations of corresponding test patterns, one or more candidates for one or more corresponding faults, one or more alerts, and/or one or more thresholds (e.g., the watermark fault count threshold, the signal quality fault count threshold, the structural fault count threshold, etc.). In the example of FIG. 2, the datastore 212 may be implemented by a volatile memory (e.g., a Synchronous Dynamic Random-Access Memory (SDRAM), DRAM, RAMBUS Dynamic Random-Access Memory (RDRAM), etc.) and/or a non-volatile memory (e.g., flash memory). The example datastore 212 may additionally or alternatively be implemented by one or more double data rate (DDR) memories, such as DDR, DDR2, DDR3, DDR4, mobile DDR (mDDR), etc.

In additional or alternative examples, the example datastore 212 may be implemented by one or more mass storage devices such as hard disk drive(s), compact disk drive(s), digital versatile disk drive(s), solid-state disk drive(s), etc. While in the illustrated example the datastore 212 is illustrated as a single database, the datastore 212 may be implemented by any number and/or type(s) of databases. Furthermore, the data stored in the datastore 212 may be in any data format such as, for example, binary data, comma delimited data, tab delimited data, structured query language (SQL) structures, etc.

In some examples, the performance monitoring circuitry 102 includes means for generating a test pattern. For example, the means for generating a test pattern may be implemented by the test pattern generation circuitry 202. In some examples, the test pattern generation circuitry 202 may be instantiated by processor circuitry such as the example processor circuitry 812 of FIG. 8. For instance, the test pattern generation circuitry 202 may be instantiated by the example microprocessor 900 of FIG. 9 executing machine executable instructions such as those implemented by at least block 302 of FIG. 3, at least block 402 of FIG. 4, at least block 502 of FIG. 5, at least block 602 of FIG. 6, and/or at least block 702 of FIG. 7. In some examples, the test pattern generation circuitry 202 may be instantiated by hardware logic circuitry, which may be implemented by an ASIC, XPU, or the FPGA circuitry 1000 of FIG. 10 structured to perform operations corresponding to the machine-readable instructions. Additionally or alternatively, the test pattern generation circuitry 202 may be instantiated by any other combination of hardware, software, and/or firmware. For example, the test pattern generation circuitry 202 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In some examples, the performance monitoring circuitry 102 includes means for processing signals. For example, the means for processing signals may be implemented by the signal processing circuitry 204. In some examples, the signal processing circuitry 204 may be instantiated by processor circuitry such as the example processor circuitry 812 of FIG. 8. For instance, the signal processing circuitry 204 may be instantiated by the example microprocessor 900 of FIG. 9 executing machine executable instructions such as those implemented by at least blocks 304, 306, 308, and 310 of FIG. 3, at least blocks 404, 406, 408, and 410 of FIG. 4, at least blocks 504 and 506 of FIG. 5, at least blocks 604 and 606 of FIG. 6, and/or at least blocks 704, 706, and 708 of FIG. 7. In some examples, the signal processing circuitry 204 may be instantiated by hardware logic circuitry, which may be implemented by an ASIC, XPU, or the FPGA circuitry 1000 of FIG. 10 structured to perform operations corresponding to the machine-readable instructions. Additionally or alternatively, the signal processing circuitry 204 may be instantiated by any other combination of hardware, software, and/or firmware. For example, the signal processing circuitry 204 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In some examples, the performance monitoring circuitry 102 includes means for comparing. For example, the means for comparing may be implemented by the comparator circuitry 206. In some examples, the comparator circuitry 206 may be instantiated by processor circuitry such as the example processor circuitry 812 of FIG. 8. For instance, the comparator circuitry 206 may be instantiated by the example microprocessor 900 of FIG. 9 executing machine executable instructions such as those implemented by at least blocks 508, 510, 512, 514, and 516 of FIG. 5, at least blocks 608, 610, 612, 614, 616, and 618 of FIG. 6, and/or at least blocks 710, 712, 714, 716, and 718 of FIG. 7. In some examples, the comparator circuitry 206 may be instantiated by hardware logic circuitry, which may be implemented by an ASIC, XPU, or the FPGA circuitry 1000 of FIG. 10 structured to perform operations corresponding to the machine-readable instructions. Additionally or alternatively, the comparator circuitry 206 may be instantiated by any other combination of hardware, software, and/or firmware. For example, the comparator circuitry 206 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In some examples, the performance monitoring circuitry 102 includes means for generating an alert. For example, the means for generating an alert may be implemented by the alert generation circuitry 208. In some examples, the alert generation circuitry 208 may be instantiated by processor circuitry such as the example processor circuitry 812 of FIG. 8. For instance, the alert generation circuitry 208 may be instantiated by the example microprocessor 900 of FIG. 9 executing machine executable instructions such as those implemented by at least block 518 of FIG. 5, at least block 620 of FIG. 6, and/or at least block 720 of FIG. 7. In some examples, the alert generation circuitry 208 may be instantiated by hardware logic circuitry, which may be implemented by an ASIC, XPU, or the FPGA circuitry 1000 of FIG. 10 structured to perform operations corresponding to the machine-readable instructions. Additionally or alternatively, the alert generation circuitry 208 may be instantiated by any other combination of hardware, software, and/or firmware. For example, the alert generation circuitry 208 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

In some examples, the performance monitoring circuitry 102 includes means for controlling I/O. For example, the means for controlling I/O may be implemented by the I/O control circuitry 210. In some examples, the I/O control circuitry 210 may be instantiated by processor circuitry such as the example processor circuitry 812 of FIG. 8. For instance, the I/O control circuitry 210 may be instantiated by the example microprocessor 900 of FIG. 9 executing machine executable instructions such as those implemented by at least block 520 of FIG. 5, at least block 622 of FIG. 6, and/or at least block 722 of FIG. 7. In some examples, the I/O control circuitry 210 may be instantiated by hardware logic circuitry, which may be implemented by an ASIC, XPU, or the FPGA circuitry 1000 of FIG. 10 structured to perform operations corresponding to the machine-readable instructions. Additionally or alternatively, the I/O control circuitry 210 may be instantiated by any other combination of hardware, software, and/or firmware. For example, the I/O control circuitry 210 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine-readable instructions and/or to perform some or all of the operations corresponding to the machine-readable instructions without executing software or firmware, but other structures are likewise appropriate.

While an example manner of implementing the performance monitoring circuitry 102 of FIG. 1 is illustrated in FIG. 2, one or more of the elements, processes, and/or devices illustrated in FIG. 2 may be combined, divided, re-arranged, omitted, eliminated, and/or implemented in any other way. Further, the example test pattern generation circuitry 202, the example signal processing circuitry 204, the example comparator circuitry 206, the example alert generation circuitry 208, the example I/O control circuitry 210, the example datastore 212, and/or, more generally, the example performance monitoring circuitry 102 of FIGS. 1 and/or 2, may be implemented by hardware alone or by hardware in combination with software and/or firmware. Thus, for example, any of the example test pattern generation circuitry 202, the example signal processing circuitry 204, the example comparator circuitry 206, the example alert generation circuitry 208, the example I/O control circuitry 210, the example datastore 212, and/or, more generally, the example performance monitoring circuitry 102 of FIGS. 1 and/or 2, could be implemented by processor circuitry, analog circuit(s), digital circuit(s), logic circuit(s), programmable processor(s), programmable microcontroller (s), graphics processing unit(s) (GPU(s)), digital signal processor(s) (DSP(s)), application specific integrated circuit (s) (ASIC(s)), programmable logic device(s) (PLD(s)), and/or field programmable logic device(s) (FPLD(s)) such as Field Programmable Gate Arrays (FPGAs). Further still, the example performance monitoring circuitry 102 of FIGS. 1 and/or 2 may include one or more elements, processes, and/or devices in addition to, or instead of, those illustrated in FIG. 2, and/or may include more than one of any or all of the illustrated elements, processes, and devices.

Flowcharts representative of example machine-readable instructions, which may be executed to configure processor circuitry (e.g., machine-readable instructions cause processor circuitry) to implement the performance monitoring circuitry 102 of FIGS. 1 and/or 2, are shown in FIGS. 3, 4, 5, 6, and 7. The machine-readable instructions may be one or more executable programs or portion(s) of an executable program for execution by processor circuitry, such as the processor circuitry 812 shown in the example processor platform 800 discussed below in connection with FIG. 8 and/or the example processor circuitry discussed below in connection with FIGS. 9 and/or 10. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine-readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 3, 4, 5, 6, and 7 many other methods of implementing the example performance monitoring circuitry 102 of FIGS. 1 and/or 2 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine-readable instructions described herein may be stored in one or more of a compressed format, an encrypted format, a fragmented format, a compiled format, an executable format, a packaged format, etc. Machine-readable instructions as described herein may be stored as data or a data structure (e.g., as portions of instructions, code, representations of code, etc.) that may be utilized to create, manufacture, and/or produce machine executable instructions. For example, the machine-readable instructions may be fragmented and stored on one or more storage devices and/or computing devices (e.g., servers) located at the same or different locations of a network or collection of networks (e.g., in the cloud, in edge devices, etc.). The machine-readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine-readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine-readable instructions may be stored in a state in which they may be read by processor circuitry, but require addition of a library (e.g., a dynamic link library (DLL)), a software development kit (SDK), an application programming interface (API), etc., in order to execute the machine-readable instructions on a particular computing device or other device. In another example, the machine-readable instructions may need to be configured (e.g., settings stored, data input, network addresses recorded, etc.) before the machine-readable instructions and/or the corresponding program(s) can be executed in whole or in part. Thus, machine-readable media, as used herein, may include machine-readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 3, 4, 5, 6, and/or 7 may be implemented using executable instructions (e.g., computer and/or machine-readable instructions) stored on one or more non-transitory computer and/or machine-readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine-readable medium, and non-transitory machine-readable storage medium are expressly defined to include any type of computer readable storage device and/or storage disk and to exclude propagating signals and to exclude transmission media. As used herein, the terms "computer readable storage device" and "machine-readable storage device" are defined to include any physical (mechanical and/or electrical) structure to store information, but to exclude propagating signals and to exclude transmission media. Examples of computer readable storage devices and machine-readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine-readable instructions, etc., and/or manufactured to execute computer readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 3:
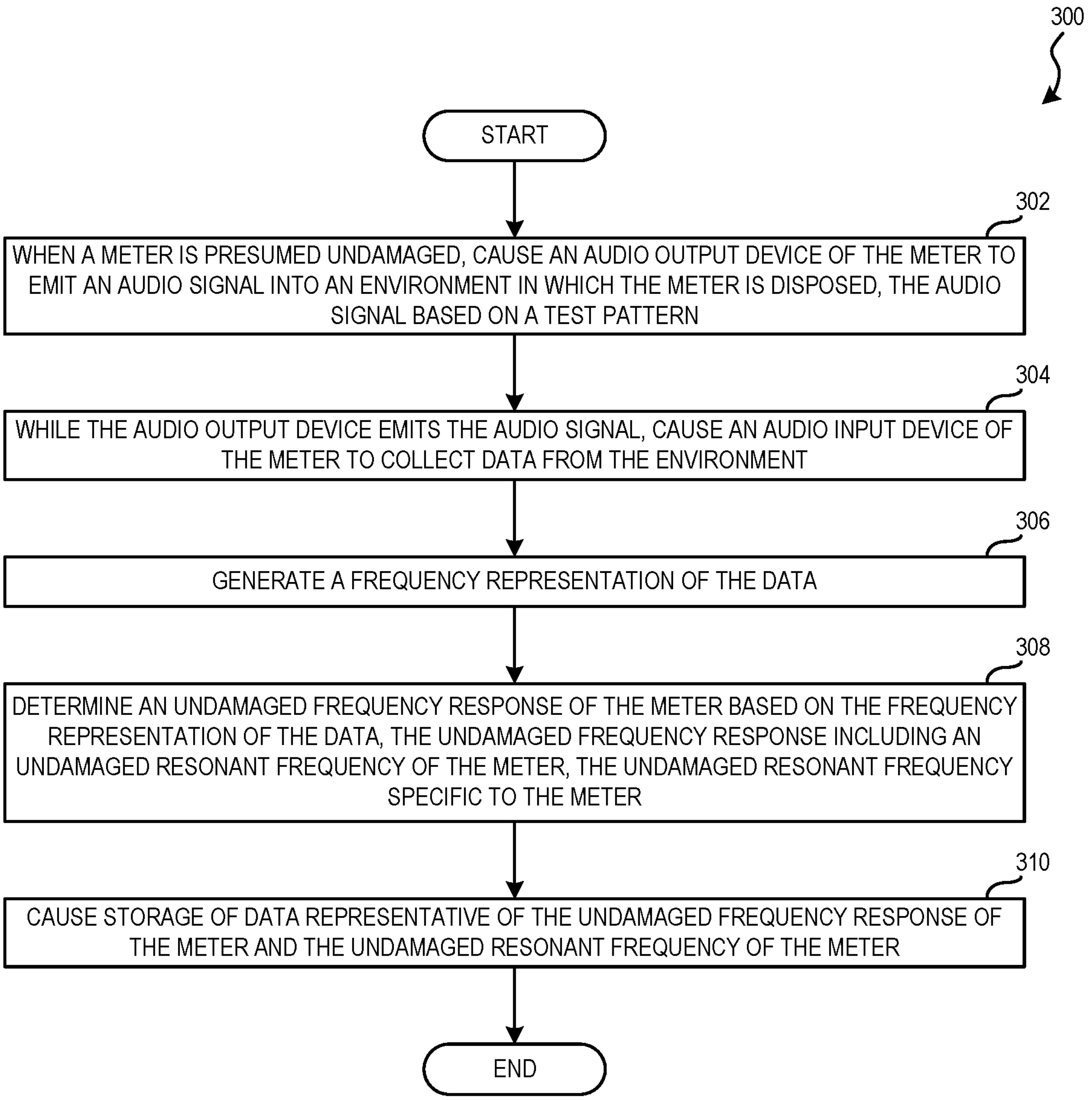
FIG. 3 is a flowchart representative of example machine-readable instructions and/or example operations that may be executed and/or instantiated by processor circuitry to implement the performance monitoring circuitry of FIGS. 1 and/or 2 to determine an undamaged frequency response of the meter of FIG. 1.

FIG. 3 is a flowchart representative of example machine-readable instructions and/or example operations 300 that may be executed and/or instantiated by processor circuitry to implement the performance monitoring circuitry 102 of FIGS. 1 and/or 2 to determine an undamaged frequency response of the meter 100 of FIG. 1. The machine-readable instructions and/or the operations 300 of FIG. 3 may be executed when the meter 100 is presumed to be undamaged. For example, after the meter 100 is manufactured, but before the meter 100 is deployed to a panelist household, the meter 100 may be presumed undamaged. The machine-readable instructions and/or the operations 300 of FIG. 3 begin at block 302, at which the test pattern generation circuitry 202 causes the audio output device 104 of the meter 100 to emit an audio signal into an environment in which the meter 100 is disposed, the audio signal based on a test pattern. For example, the test pattern generation circuitry 202 generates a test pattern (e.g., the test pattern 110) including a sweep of tones and instructs the audio output device 104 to emit the test pattern.

In the illustrated example of FIG. 3, at block 304, while the audio output device 104 emits the audio signal (e.g., during emission of the audio signal), the signal processing circuitry 204 causes the audio input device 106 to collect data from the environment in which the meter 100 is disposed. At block 306, the signal processing circuitry 204 generates a frequency representation of the data collected by the audio input device 106. For example, the signal processing circuitry 204 generates an FFT of the data collected by the audio input device 106.

In the illustrated example of FIG. 3, at block 308, the signal processing circuitry 204 determines an undamaged (or baseline) frequency response of the meter 100 based on the frequency representation of the data. In the example of FIG. 3, the undamaged frequency response of the meter 100 includes an undamaged (or baseline) resonant frequency of the meter 100 (e.g., of the housing of the meter 100). The undamaged resonant frequency of the meter 100 is unique to the meter 100 in its undamaged state. That is, the undamaged resonant frequency of the meter 100 is different from the undamaged resonant frequency of other meter and different from the resonant frequency of the meter 100 when the meter 100 is damaged (e.g., a fault is present in the meter 100).

In the illustrated example of FIG. 3, at block 310, the signal processing circuitry 204 causes storage of data representative of the undamaged frequency response of the meter 100 and the undamaged resonant frequency of the meter 100. In the example of FIG. 3, the signal processing circuitry 204 causes storage of the data in the datastore 212. In additional or alternative examples, the signal processing circuitry 204 causes storage of the data in a remote storage device (e.g., remote with respect to the meter 100). At a later time, the remote device may transmit to the meter 100 the data representative of the undamaged frequency response of the meter 100 and the undamaged resonant frequency of the meter 100.

Figure 4:
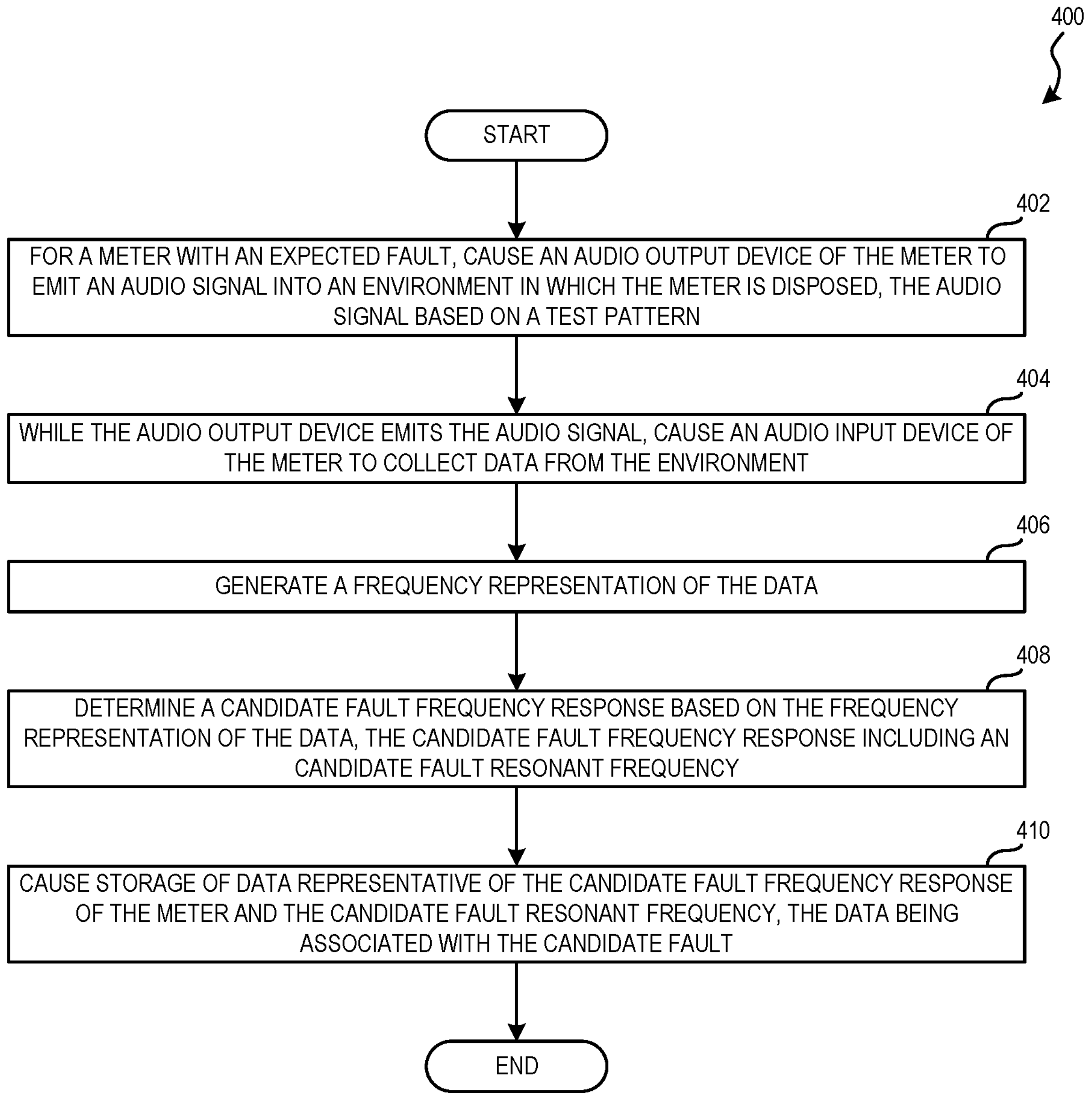
FIG. 4 is a flowchart representative of example machine-readable instructions and/or example operations that may be executed and/or instantiated by processor circuitry to implement the performance monitoring circuitry of FIGS. 1 and/or 2 to determine one or more candidate fault frequency responses of meters similar to the meter 100 of FIG. 1.

FIG. 4 is a flowchart representative of example machine-readable instructions and/or example operations 400 that may be executed and/or instantiated by processor circuitry to implement the performance monitoring circuitry 102 of FIGS. 1 and/or 2 to determine one or more candidate fault frequency responses of meters similar to the meter 100 of FIG. 1 (or the meter 100 itself). For example, similar meters may include meters having the same manufacturer as the meter 100 of FIG. 1, meters having the same model identifier (e.g., number) as the meter 100 of FIG. 1, meters in the same family of products as the meter 100 of FIG. 1, meters having the same hardware, firmware, and/or software version identifier as the meter 100 of FIG. 1, etc. The machine-readable instructions and/or the operations 400 of FIG. 4 may be executed on meters having a manually induced fault that may occur during deployment of the meter 100. For example, an entity associated with an audience measurement company that issued the meter 100 may manually induce one or more candidate faults in meters that are similar to (e.g., the same model as) the meter 100. The machine-readable instructions and/or the operations 400 of FIG. 4 may be executed for any number of candidate faults. In this manner, meters that are deployed to panelist households may be preloaded with frequency responses and/or resonant frequencies corresponding to candidate faults thereby enabling self-diagnosis of deployed meters.

In the illustrated example of FIG. 4, the machine-readable instructions and/or the operations 400 of FIG. 4 begin at block 402, at which the test pattern generation circuitry 202 causes the audio output device 104 of a meter similar to the meter 100 (or the meter 100 itself) to emit an audio signal based on the test pattern into an environment in which the similar meter is disposed. For example, the test pattern generation circuitry 202 generates a test pattern (e.g., the test pattern 110) including a sweep of tones and instructs the audio output device 104 to emit the test pattern. In the example of FIG. 4, at block 402, the test pattern generation circuitry 202 generates the same test pattern as generated at block 302 of FIG. 3. At block 404, while the audio output device 104 emits the audio signal, the signal processing circuitry 204 causes the audio input device 106 to collect data from the environment in which the similar meter is disposed. At block 406, the signal processing circuitry 204 generates a frequency representation of the data collected by the audio input device 106. For example, the signal processing circuitry 204 generates an FFT of the data collected by the audio input device 106.

In the illustrated example of FIG. 4, at block 408, the signal processing circuitry 204 determines a candidate fault frequency response based on the frequency representation of the data. In the example of FIG. 4, the candidate fault frequency response includes a candidate fault resonant frequency. At block 410, the signal processing circuitry 204 causes storage of data representative of the candidate fault frequency response and the candidate fault resonant frequency, the data being associated with the candidate fault. For example, the data is labeled with the candidate fault. In the example of FIG. 4, the signal processing circuitry 204 causes storage of the data in a remote storage device (e.g., remote with respect to the similar meter). At a later time, the remote device may transmit, to a meter that is to be deployed (e.g., the meter 100), the data representative of the candidate fault frequency response and the candidate fault resonant frequency.

Figure 5:
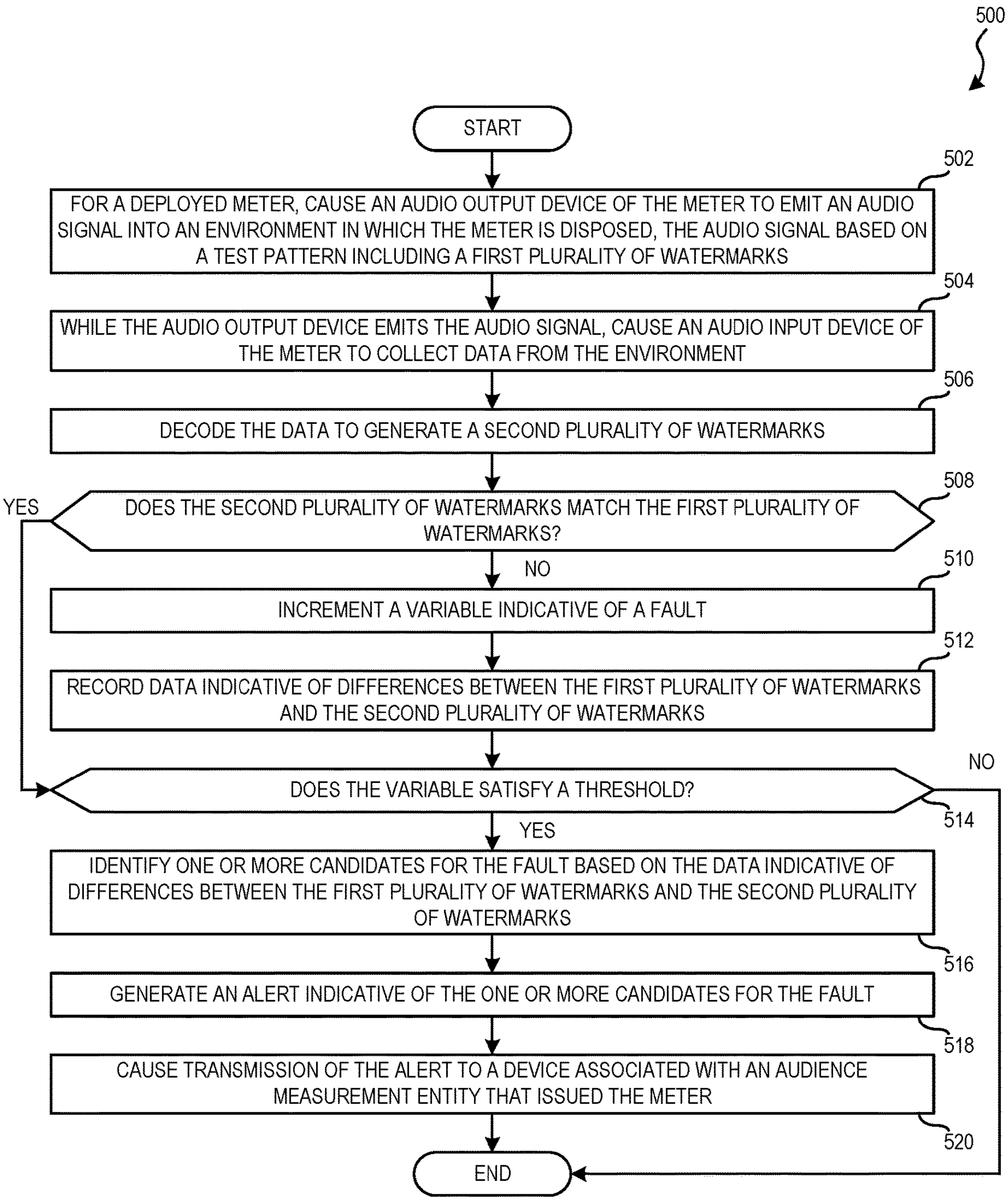
FIGS. 5 and 6 are flowcharts representative of example machine-readable instructions and/or example operations that may be executed and/or instantiated by processor circuitry to implement the performance monitoring circuitry of FIGS. 1 and/or 2 to evaluate the performance of the meter of FIG. 1.

FIG. 5 is a flowchart representative of example machine-readable instructions and/or example operations 500 that may be executed and/or instantiated by processor circuitry to implement the performance monitoring circuitry 102 of FIGS. 1 and/or 2 to evaluate the performance of the meter 100 of FIG. 1. The machine-readable instructions and/or the operations 500 of FIG. 5 may be executed daily (e.g., on a daily basis) when the meter 100 is coupled to a charger. The machine-readable instructions and/or the operations 500 of FIG. 5 begin at block 502, at which the test pattern generation circuitry 202 causes the audio output device 104 of the meter 100 to emit an audio signal into an environment in which the meter 100 is disposed, the audio signal based on a test pattern. For example, the test pattern generation circuitry 202 generates a test pattern (e.g., the test pattern 110) including a first plurality of watermarks.

In the illustrated example of FIG. 5, at block 504, while the audio output device 104 emits the audio signal (e.g., during emission of the audio signal), the signal processing circuitry 204 causes the audio input device 106 to collect data from the environment in which the meter 100 is disposed. At block 506, the signal processing circuitry 204 decodes the data collected by the audio input device 106 to generate a second plurality of watermarks. For example, the signal processing circuitry 204 generates a binary vector indicating the frequency content in frequency bins of the audio signal.

While examples disclosed herein refer to generating a second plurality of watermarks from the collected data, it should be noted that in some examples the collected data may not include the first plurality of watermarks. For example, if the audio output device 104 is defective none of the first plurality of watermarks may be emitted into the environment. In such examples, the signal processing circuitry 204 generates a binary vector indicative of the frequency content in frequency bins of the audio signal collected by the audio input device 106. Such a binary vector is representative of a second plurality of watermarks decoded from the audio signal but does not necessarily correspond to the first plurality of watermarks included in the test pattern.

In the illustrated example of FIG. 5, at block 508, the comparator circuitry 206 compares the second plurality of watermarks decoded from the data to the first plurality of watermarks included in the test pattern. For example, the comparator circuitry 206 determines whether the second plurality of watermarks decoded from the data matches the first plurality of watermarks. In such examples, the comparator circuitry 206 determines that the second plurality of watermarks matches the first plurality of watermarks if the elements of a second binary vector (corresponding to the second plurality of watermarks) equal corresponding elements of a first binary vector (corresponding to the first plurality of watermarks).

In the illustrated example of FIG. 5, in response to the comparator circuitry 206 determining that the second plurality of watermarks matches the first plurality of watermarks (block 508: YES), the machine-readable instructions and/or the operations 500 proceed to block 514. In response to the comparator circuitry 206 determining that the second plurality of watermarks does not match the first plurality of watermarks (block 508: NO), the machine-readable instructions and/or the operations 500 proceed to block 510. For example, if one or more of the elements of the first binary vector do not equal one or more corresponding elements of the second binary vector, the comparator circuitry 206 determines that the first plurality of watermarks does not match the second plurality of watermarks.

In the illustrated example of FIG. 5, at block 510, the comparator circuitry 206 increments a variable indicative of a fault (e.g., a watermark fault variable). At block 512, the comparator circuitry 206 records data indicative of differences between the first plurality of watermarks and the second plurality of watermarks in the datastore 212. For example, as described above, a test pattern may include a first watermark to be emitted at a first frequency at a first time and a second watermark to be emitted at a second frequency at a second time. In such examples, the comparator circuitry 206 records data to reflect whether one or more of the first watermark or the second watermark was not detected by the audio input device 106.

In the illustrated example of FIG. 5, at block 514, the comparator circuitry 206 determines whether the variable indicative of the fault (e.g., the watermark fault variable) satisfies a second threshold (e.g., a watermark fault count threshold). In response to the comparator circuitry 206 determining that the variable indicative of the fault (e.g., the watermark fault count threshold) does not satisfy the second threshold (block 514: NO), the machine-readable instructions and/or the operations 500 terminate. The machine-readable instructions and/or the operations 500 may be re-executed the next time the meter 100 is coupled to the charger of the meter 100.

In the illustrated example of FIG. 5, in response to the comparator circuitry 206 determining that the variable indicative of the fault satisfies the second threshold (block 514: YES), the machine-readable instructions and/or the operations 500 proceed to block 516. At block 516, the comparator circuitry 206 identifies one or more candidates for the fault based on the data indicative of the differences between the first plurality of watermarks and the second plurality of watermarks. At block 518, the alert generation circuitry 208 generates an alert indicative of the one or more candidates for the fault. At block 520, the I/O control circuitry 210 causes transmission (e.g., via the transmission circuitry 108) of the alert to a device associated with the audience measurement entity that issued the meter 100. In this manner, based on a difference between the first plurality of watermarks and the second plurality of watermarks, the I/O control circuitry 210 causes an alert to be transmitted to a device associated with the audience measurement company that issued the meter 100.

Figure 6:
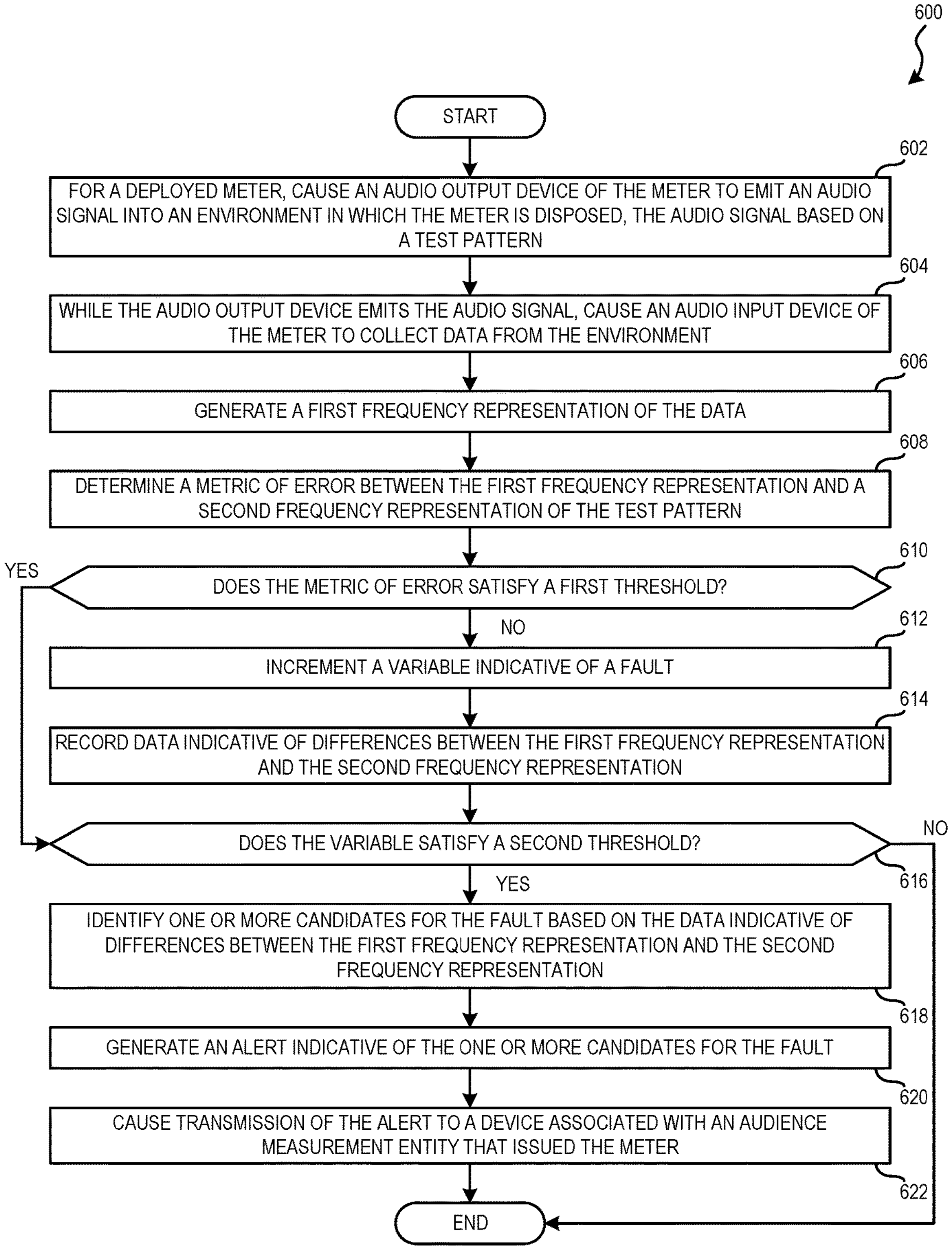

FIG. 6 is a flowchart representative of example machine-readable instructions and/or example operations 600 that may be executed and/or instantiated by processor circuitry to implement the performance monitoring circuitry 102 of FIGS. 1 and/or 2 to evaluate the performance of the meter 100 of FIG. 1. The machine-readable instructions and/or the operations 600 of FIG. 6 may be executed daily (e.g., on a daily basis) when the meter 100 is coupled to a charger. The machine-readable instructions and/or the operations 600 of FIG. 6 begin at block 602, at which the test pattern generation circuitry 202 causes the audio output device 104 of the meter 100 to emit an audio signal into an environment in which the meter 100 is disposed, the audio signal to represent a test pattern. For example, at block 602, the test pattern generation circuitry 202 generates the same test pattern as generated at block 302 of FIG. 3 and/or block 402 of FIG. 4.

In the illustrated example of FIG. 6, at block 604, while the audio output device 104 emits the audio signal (e.g., during emission of the audio signal), the signal processing circuitry 204 causes the audio input device 106 to collect data from the environment in which the meter 100 is disposed. For example, the signal processing circuitry 204 causes the audio input device 106 to collect data during emission of the audio signal. At block 606, the signal processing circuitry 204 generates a frequency representation of the data collected by the audio input device 106. For example, the signal processing circuitry 204 generates an FFT of the data collected by the audio input device 106.

In the illustrated example of FIG. 6, at block 608, the comparator circuitry 206 determines a metric of error between the frequency representation of the collected data (e.g., a first frequency representation) and the frequency representation of the test pattern (e.g., a second frequency representation). For example, the comparator circuitry 206 determines a mean squared error between the frequency representation of the collected data and the frequency representation of the test pattern. At block 610, the comparator circuitry 206 determines whether the metric of error satisfies a first threshold. For example, the comparator circuitry 206 determines whether the metric of error is less than or equal to the first threshold. In some examples, the comparator circuitry 206 compares an average value of the magnitude of the deployed frequency representation to an ambient noise threshold. In such examples, the comparator circuitry 206 determines whether the average value of the deployed frequency representation is greater than the ambient noise threshold. In additional or alternative examples, the comparator circuitry determines whether the average value of the deployed frequency representation is greater than zero (e.g., to determine whether any audio has been collected).

In the illustrated example of FIG. 6, in response to the comparator circuitry 206 determining that the metric of error satisfies the first threshold (block 610: YES), the machine-readable instructions and/or the operations 600 proceed to block 616. In response to the comparator circuitry 206 determining that the metric of error does not satisfy the first threshold (block 610: NO), the machine-readable instructions and/or the operations 600 proceed to block 612. At block 612, the comparator circuitry 206 increments a variable indicative of a fault (e.g., a signal quality fault variable). At block 614, the comparator circuitry 206 records data indicative of differences between the frequency representation of the data and the frequency representation of the test pattern 110 in the datastore 212.

In the illustrated example of FIG. 6, at block 616, the comparator circuitry 206 determines whether the variable indicative of the fault (e.g., the signal quality fault variable) satisfies a second threshold (e.g., a signal quality fault count threshold). In response to the comparator circuitry 206 determining that the variable indicative of the fault (e.g., the signal quality fault variable) does not satisfy the second threshold (block 616: NO), the machine-readable instructions and/or the operations 600 terminate. The machine-readable instructions and/or the operations 600 may be re-executed the next time the meter 100 is coupled to the charger of the meter 100.

In the illustrated example of FIG. 6, in response to the comparator circuitry 206 determining that the variable indicative of the fault (e.g., the signal quality fault variable) satisfies the second threshold (block 616: YES), the machine-readable instructions and/or the operations 600 proceed to block 618. At block 618, the comparator circuitry 206 identifies one or more candidates for the fault based on the data indicative of the differences between the one or more frequency representations and the one or more frequency representations of corresponding test patterns. For example, as described above, the meter 100 may be preloaded with information about relationships between candidate faults and test patterns. In this manner, the comparator circuitry 206 may compare the identified differences to the preloaded information to ascertain one or more candidate faults that may be present in the meter 100, such as swelling of the housing of the meter 100. At block 620, the alert generation circuitry 208 generates an alert indicative of the one or more candidates for the fault (e.g., the signal quality fault). At block 622, the I/O control circuitry 210 causes transmission (e.g., via the transmission circuitry 108) of the alert to a device associated with the audience measurement entity that issued the meter 100. In this manner, based on a difference between the frequency representation of the collected data and a frequency representation of the test pattern indicative of a fault, the I/O control circuitry 210 causes an alert to be transmitted to a device associated with the audience measurement company that issued the meter 100.

Figure 7:
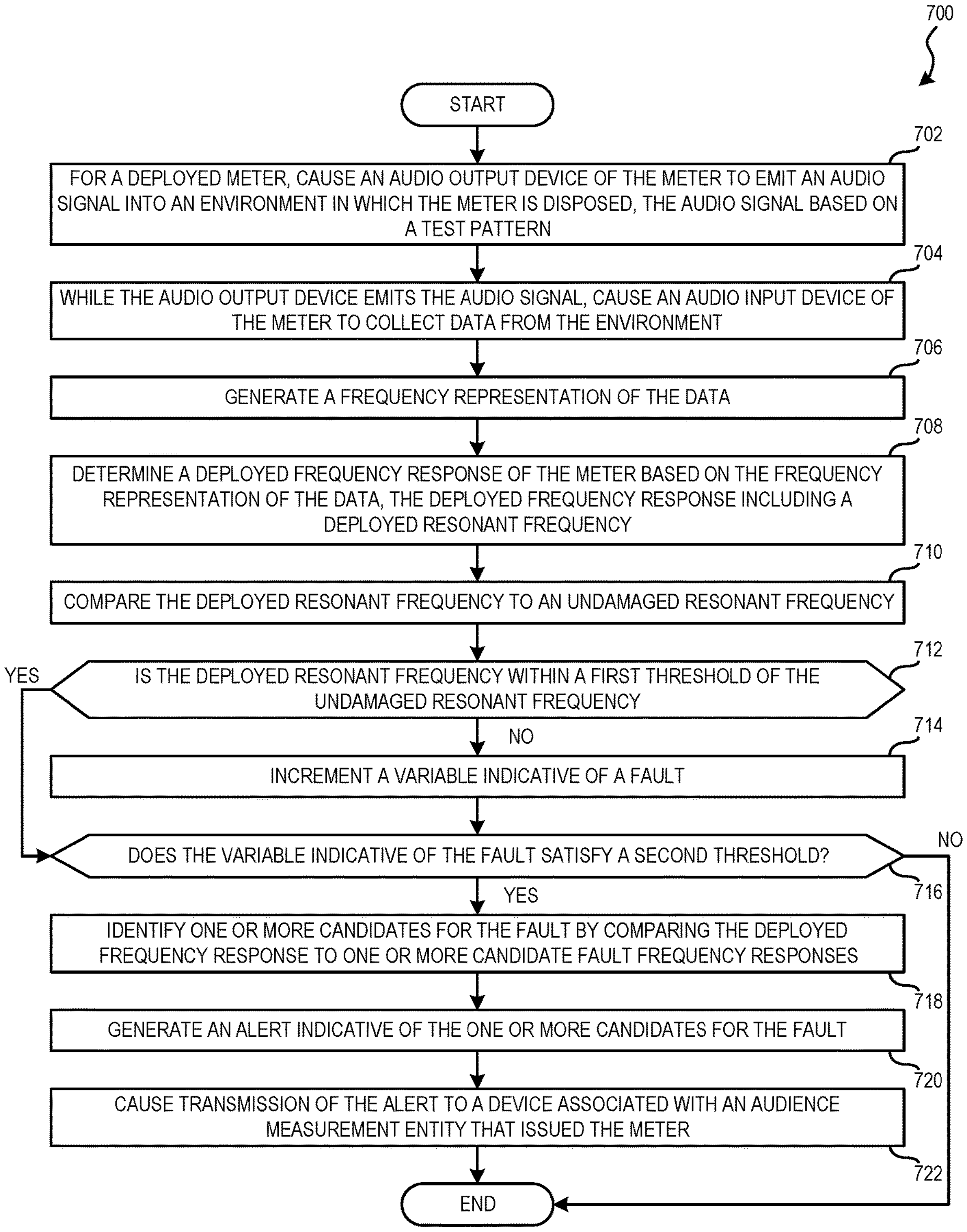
FIG. 7 is a flowchart representative of example machine-readable instructions and/or example operations that may be executed and/or instantiated by processor circuitry to implement the performance monitoring circuitry of FIGS. 1 and/or 2 to evaluate the integrity of a housing of the meter of FIG. 1.

FIG. 7 is a flowchart representative of example machine-readable instructions and/or example operations 700 that may be executed and/or instantiated by processor circuitry to implement the performance monitoring circuitry 102 of FIGS. 1 and/or 2 to evaluate the integrity of a housing of the meter 100 of FIG. 1. The machine-readable instructions and/or the operations 700 of FIG. 7 may be executed daily (e.g., on a daily basis) when the meter 100 is coupled to a charger. The machine-readable instructions and/or the operations 700 of FIG. 7 begin at block 702, at which the test pattern generation circuitry 202 causes the audio output device 104 of the meter 100 to emit an audio signal into an environment in which the meter 100 is disposed, the audio signal based on a test pattern. For example, the test pattern generation circuitry 202 generates a test pattern (e.g., the test pattern 110) including a sweep of tones. In some examples, at block 702, the test pattern generation circuitry 202 generates the same test pattern as generated at block 302 of FIG. 3 and/or block 402 of FIG. 4.

In the illustrated example of FIG. 7, at block 704, while the audio output device 104 emits the audio signal, the signal processing circuitry 204 causes the audio input device 106 to collect data from the environment in which the meter 100 is disposed. At block 706, the signal processing circuitry 204 generates a frequency representation of the data collected by the audio input device 106. For example, the signal processing circuitry 204 generates an FFT of the data collected by the audio input device 106.

In the illustrated example of FIG. 7, at block 708, the signal processing circuitry 204 determines a deployed frequency response of the meter 100 based on the frequency representation of the data. In the example of FIG. 7, the deployed frequency response of the meter 100 includes a deployed resonant frequency of the meter 100 (e.g., of the housing of the meter 100). For example, as described above, the deployed resonant frequency of the meter 100 corresponds to a resonant frequency of the meter 100 determined based on data collected by the meter 100 at a time after the deployment of the meter 100. At block 710, the comparator circuitry 206 compares the deployed resonant frequency of the meter 100 to the undamaged resonant frequency of the meter 100. As described above, the undamaged resonant frequency of the meter 100 is unique in its undamaged state and different from the resonant frequency of the meter 100 when the meter 100 is damaged (e.g., a fault is present in the meter 100). In this manner, the comparator circuitry 206 can detect when a fault is present in the meter 100.

In the illustrated example of FIG. 7, at block 712, the comparator circuitry 206 determines whether the deployed resonant frequency of the meter 100 is within a first threshold (e.g., a structural integrity threshold) of the undamaged resonant frequency of the meter 100. More generally, at block 712, the comparator circuitry 206 determines whether a first resonant frequency of a housing of the meter 100 is within a first threshold of a second resonant frequency of the housing of the meter 100. As described above, the first resonant frequency may be determined at a first time when the meter 100 was presumed undamaged and the second resonant frequency may be determined at a second time after deployment of the meter 100.

In the illustrated example of FIG. 7, in response to the comparator circuitry 206 determining that the deployed resonant frequency of the meter 100 is within the first threshold (e.g., the structural integrity threshold) of the undamaged resonant frequency of the meter 100 (block 712: YES), the machine-readable instructions and/or the operations 700 proceed to block 716. In response to the comparator circuitry 206 determining that that the deployed resonant frequency of the meter 100 is not within the first threshold (e.g., the structural integrity threshold) of the undamaged resonant frequency of the meter 100 (block 712: NO), the machine-readable instructions and/or the operations 700 proceed to block 714. At block 714, the comparator circuitry 206 increments a variable indicative of a fault (e.g., a structural fault variable). In some examples, the comparator circuitry 206 compares the deployed frequency response to the undamaged frequency response. In such examples, the comparator circuitry 206 determines a metric of error (e.g., a mean squared error) between the deployed frequency response and the undamaged frequency response.

In the illustrated example of FIG. 7, at block 716, the comparator circuitry 206 determines whether the variable indicative of the fault (e.g., a structural fault variable) satisfies a second threshold (e.g., a structural fault count threshold). In response to the comparator circuitry 206 determining that the variable indicative of the fault (e.g., a structural fault variable) does not satisfy the second threshold (block 716: NO), the machine-readable instructions and/or the operations 700 terminate. The machine-readable instructions and/or the operations 700 may be re-executed the next time the meter 100 is coupled to the charger of the meter 100.

In the illustrated example of FIG. 7, in response to the comparator circuitry 206 determining that the variable indicative of the fault (e.g., a structural fault variable) satisfies the second threshold (block 716: YES), the machine-readable instructions and/or the operations 700 proceed to block 718. At block 718, the comparator circuitry 206 identifies one or more candidates for the fault by comparing the deployed frequency response of the meter 100 to one or more candidate fault frequency responses. For example, the comparator circuitry 206 determines a metric of error between the deployed frequency response of the meter 100 and the one or more candidate fault frequency responses. In such examples, a candidate fault may be identified as a fault of the one or more candidates that has the lowest metric of error. At block 720, the alert generation circuitry 208 generates an alert indicative of the one or more candidates for the fault. At block 722, the I/O control circuitry 210 causes transmission (e.g., via the transmission circuitry 108) of the alert to a device associated with the audience measurement entity that issued the meter 100. In this manner, based on a difference between a first resonant frequency and a second resonant frequency indicative of a fault, the I/O control circuitry 210 cause an alert to be transmitted to a device associated with the audience measurement company that issued the meter 100.

Figure 8:
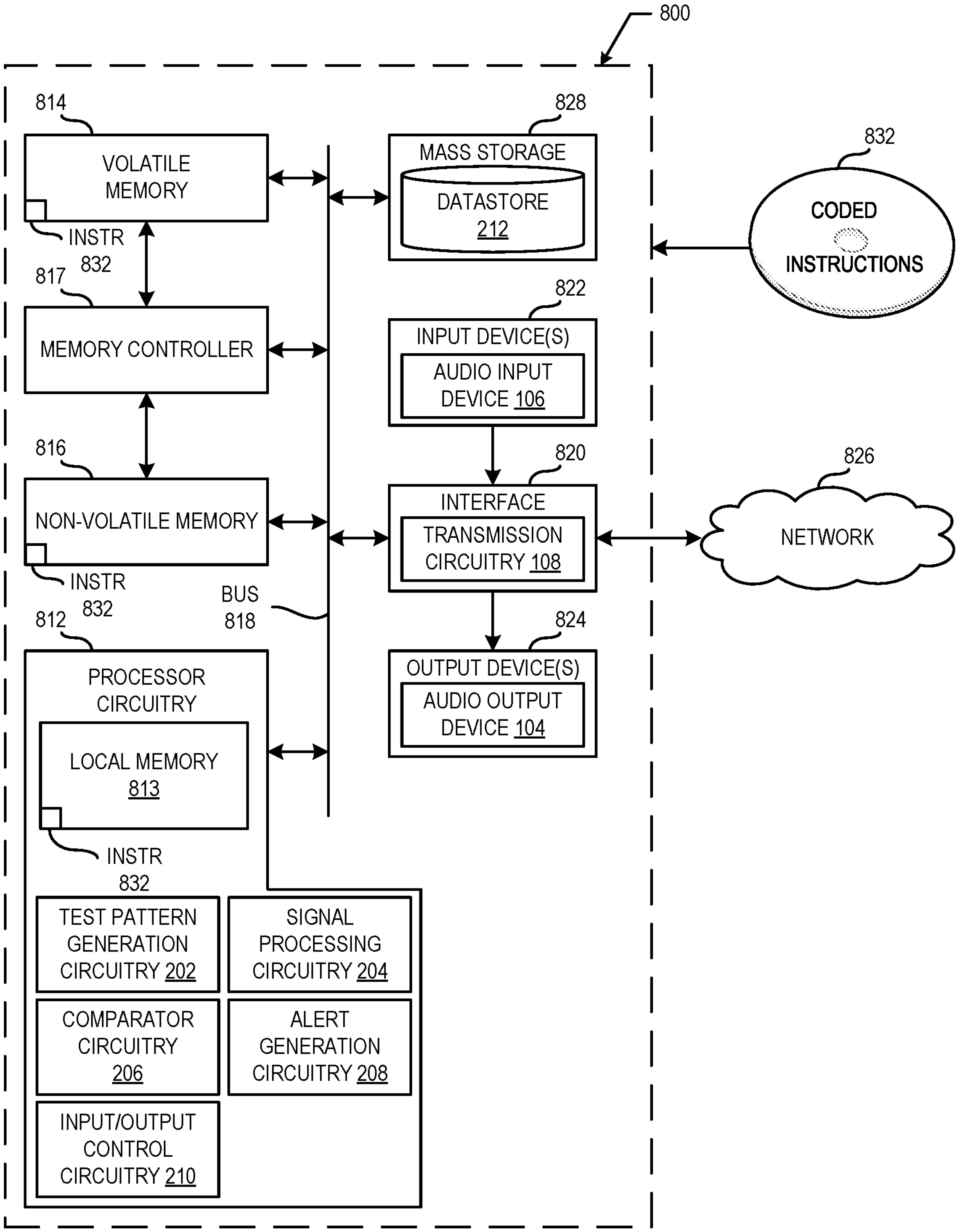
FIG. 8 is a block diagram of an example processing platform including processor circuitry structured to execute example machine-readable instructions and/or the example operations disclosed herein to implement the meter of FIG. 1.

FIG. 8 is a block diagram of an example processor platform 800 structured to execute and/or instantiate machine-readable instructions and/or operations of FIGS. 3, 4, 5, 6, and/or 7 to implement the performance monitoring circuitry 102 of FIGS. 1 and/or 2. The processor platform 800 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 800 of the illustrated example includes processor circuitry 812. The processor circuitry 812 of the illustrated example is hardware. For example, the processor circuitry 812 can be implemented by one or more integrated circuits, logic circuits, FPGAs, microprocessors, CPUs, GPUs, DSPs, and/or microcontrollers from any desired family or manufacturer. The processor circuitry 812 may be implemented by one or more semiconductor based (e.g., silicon based) devices. In this example, the processor circuitry 812 implements the example test pattern generation circuitry 202, the example signal processing circuitry 204, the example comparator circuitry 206, the example alert generation circuitry 208, and the example I/O control circuitry 210 of FIG. 2.

The processor circuitry 812 of the illustrated example includes a local memory 813 (e.g., a cache, registers, etc.). The processor circuitry 812 of the illustrated example is in communication with a main memory including a volatile memory 814 and a non-volatile memory 816 by a bus 818. The volatile memory 814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 816 may be implemented by flash memory and/or any other desired type of memory device. Access to the main memory 814, 816 of the illustrated example is controlled by a memory controller 817.

The processor platform 800 of the illustrated example also includes interface circuitry 820. The interface circuitry 820 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface. In this example, the interface circuitry 820 implements the transmission circuitry 108 of FIG. 1.

In the illustrated example, one or more input devices 822 are connected to the interface circuitry 820. The input device(s) 822 permit(s) a user to enter data and/or commands into the processor circuitry 812. The input device(s) 822 can be implemented by, for example, an audio sensor, a microphone, a camera (still or video), a keyboard, a button, a mouse, a touchscreen, a track-pad, a trackball, an isopoint device, and/or a voice recognition system. In this example, the one or more input device 822 implement the audio input device 106 of FIG. 1.

One or more output devices 824 are also connected to the interface circuitry 820 of the illustrated example. The output device(s) 824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. In this example, the one or more output devices 824 implement the audio output device 104 of FIG. 1. The interface circuitry 820 of the illustrated example, thus, typically includes a graphics driver card, a graphics driver chip, and/or graphics processor circuitry such as a GPU.

The interface circuitry 820 of the illustrated example also includes a communication device such as a transmitter, a receiver, a transceiver, a modem, a residential gateway, a wireless access point, and/or a network interface (e.g., the transmission circuitry 108 of FIG. 1) to facilitate exchange of data with external machines (e.g., computing devices of any kind) by a network 826. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 800 of the illustrated example also includes one or more mass storage devices 828 to store software and/or data. Examples of such mass storage devices 828 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives. In this example, the one or more mass storage devices 828 implement the datastore 212 of FIG. 2.

The machine executable instructions 832, which may be implemented by machine-readable instructions of FIGS. 3, 4, 5, 6, and/or 7, may be stored in the mass storage device 828, in the volatile memory 814, in the non-volatile memory 816, and/or on a removable non-transitory computer readable storage medium (e.g., at least one non-transitory computer readable storage medium) such as a CD or DVD.

Figure 9:
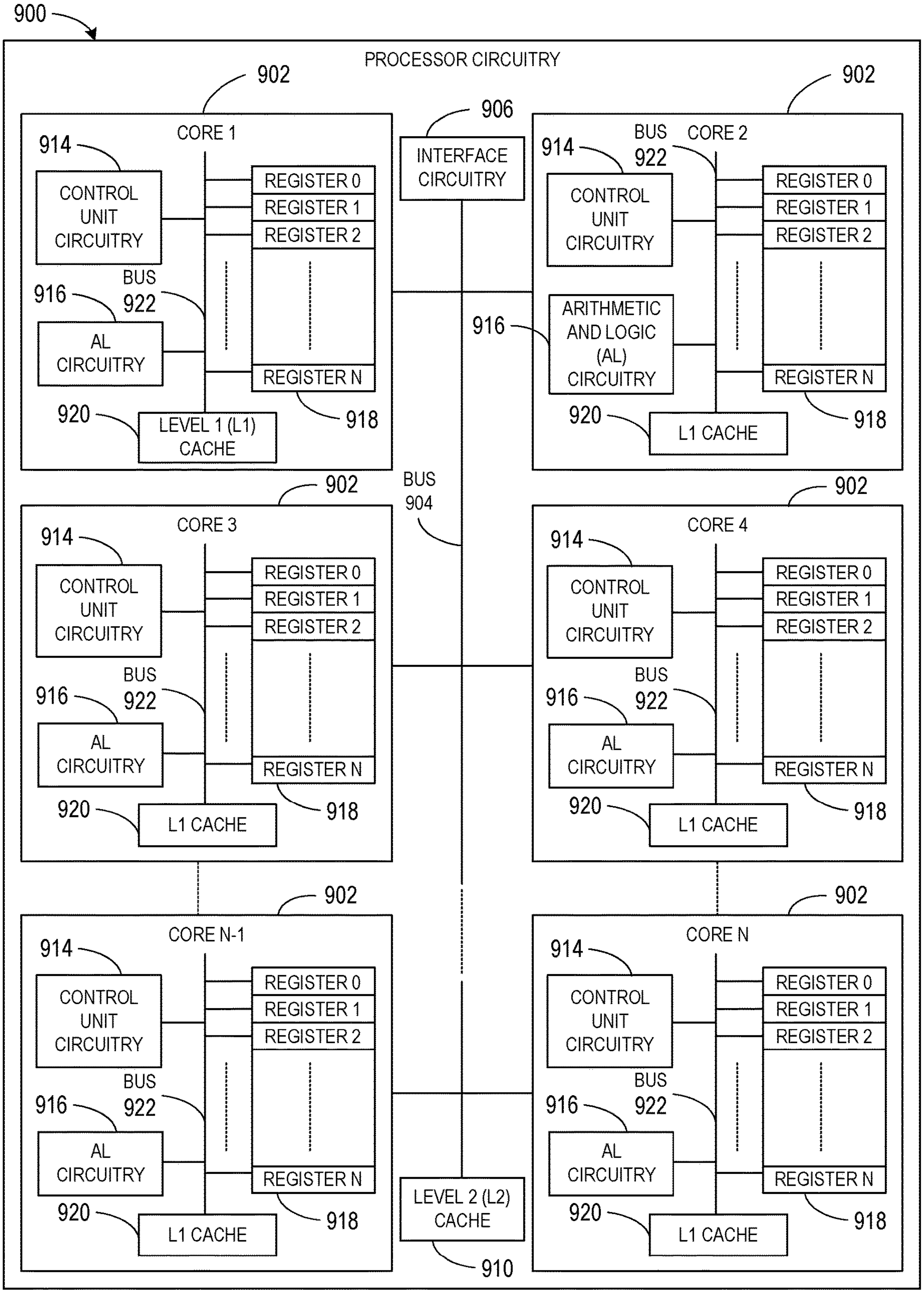
FIG. 9 is a block diagram of an example implementation of the processor circuitry of FIG. 8.

FIG. 9 is a block diagram of an example implementation of the processor circuitry 812 of FIG. 8. In this example, the processor circuitry 812 of FIG. 8 is implemented by a microprocessor 900. For example, the microprocessor 900 may be a general-purpose microprocessor (e.g., general-purpose microprocessor) circuitry. The microprocessor 900 executes some or all of the machine-readable instructions of the flowcharts of FIGS. 3, 4, 5, 6, and/or 7 to effectively instantiate the circuitry of FIG. 2 as logic circuits to perform the operations corresponding to those machine-readable instructions. In some such examples, the circuitry of FIG. 2 is instantiated by the hardware circuits of the microprocessor 900 in combination with the instructions. For example, the microprocessor 900 may implement multi-core hardware circuitry such as a CPU, a DSP, a GPU, an XPU, etc. Although it may include any number of example cores 902 (e.g., 1 core), the microprocessor 900 of this example is a multi-core semiconductor device including N cores. The cores 902 of the microprocessor 900 may operate independently or may cooperate to execute machine-readable instructions. For example, machine code corresponding to a firmware program, an embedded software program, or a software program may be executed by one of the cores 902 or may be executed by multiple ones of the cores 902 at the same or different times. In some examples, the machine code corresponding to the firmware program, the embedded software program, or the software program is split into threads and executed in parallel by two or more of the cores 902. The software program may correspond to a portion or all of the machine-readable instructions and/or operations represented by the flowcharts of FIGS. 3, 4, 5, 6, and/or 7.

The cores 902 may communicate by a first example bus 904. In some examples, the first bus 904 may be implemented by a communication bus to effectuate communication associated with one(s) of the cores 902. For example, the first bus 904 may implement at least one of an Inter-Integrated Circuit (I2C) bus, a Serial Peripheral Interface (SPI) bus, a PCI bus, or a PCIe bus. Additionally or alternatively, the first bus 904 may implement any other type of computing or electrical bus. The cores 902 may obtain data, instructions, and/or signals from one or more external devices by example interface circuitry 906. The cores 902 may output data, instructions, and/or signals to the one or more external devices by the interface circuitry 906. Although the cores 902 of this example include example local memory 920 (e.g., Level 1 (L1) cache that may be split into an L1 data cache and an L1 instruction cache), the microprocessor 900 also includes example shared memory 910 that may be shared by the cores (e.g., Level 2 (L2_cache)) for high-speed access to data and/or instructions. Data and/or instructions may be transferred (e.g., shared) by writing to and/or reading from the shared memory 910. The local memory 920 of each of the cores 902 and the shared memory 910 may be part of a hierarchy of storage devices including multiple levels of cache memory and the main memory (e.g., the main memory 814, 816 of FIG. 8). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 902 may be referred to as a CPU, DSP, GPU, etc., or any other type of hardware circuitry. Each core 902 includes control unit circuitry 914, arithmetic and logic (AL) circuitry 916 (sometimes referred to as an ALU), a plurality of registers 918, the L1 cache 920, and a second example bus 922. Other structures may be present. For example, each core 902 may include vector unit circuitry, single instruction multiple data (SIMD) unit circuitry, load/store unit (LSU) circuitry, branch/jump unit circuitry, floating-point unit (FPU) circuitry, etc. The control unit circuitry 914 includes semiconductor-based circuits structured to control (e.g., coordinate) data movement within the corresponding core 902. The AL circuitry 916 includes semiconductor-based circuits structured to perform one or more mathematic and/or logic operations on the data within the corresponding core 902. The AL circuitry 916 of some examples performs integer-based operations. In other examples, the AL circuitry 916 also performs floating point operations. In yet other examples, the AL circuitry 916 may include first AL circuitry that performs integer-based operations and second AL circuitry that performs floating point operations. In some examples, the AL circuitry 916 may be referred to as an Arithmetic Logic Unit (ALU). The registers 918 are semiconductor-based structures to store data and/or instructions such as results of one or more of the operations performed by the AL circuitry 916 of the corresponding core 902. For example, the registers 918 may include vector register(s), SIMD register(s), general-purpose register(s), flag register (s), segment register(s), machine specific register(s), instruction pointer register(s), control register(s), debug register(s), memory management register(s), machine check register(s), etc. The registers 918 may be arranged in a bank as shown in FIG. 9. Alternatively, the registers 918 may be organized in any other arrangement, format, or structure including distributed throughout the core 902 to shorten access time. The second bus 922 may implement at least one of an I2C bus, a SPI bus, a PCI bus, or a PCIe bus.

Each core 902 and/or, more generally, the microprocessor 900 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 900 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general-purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 10:
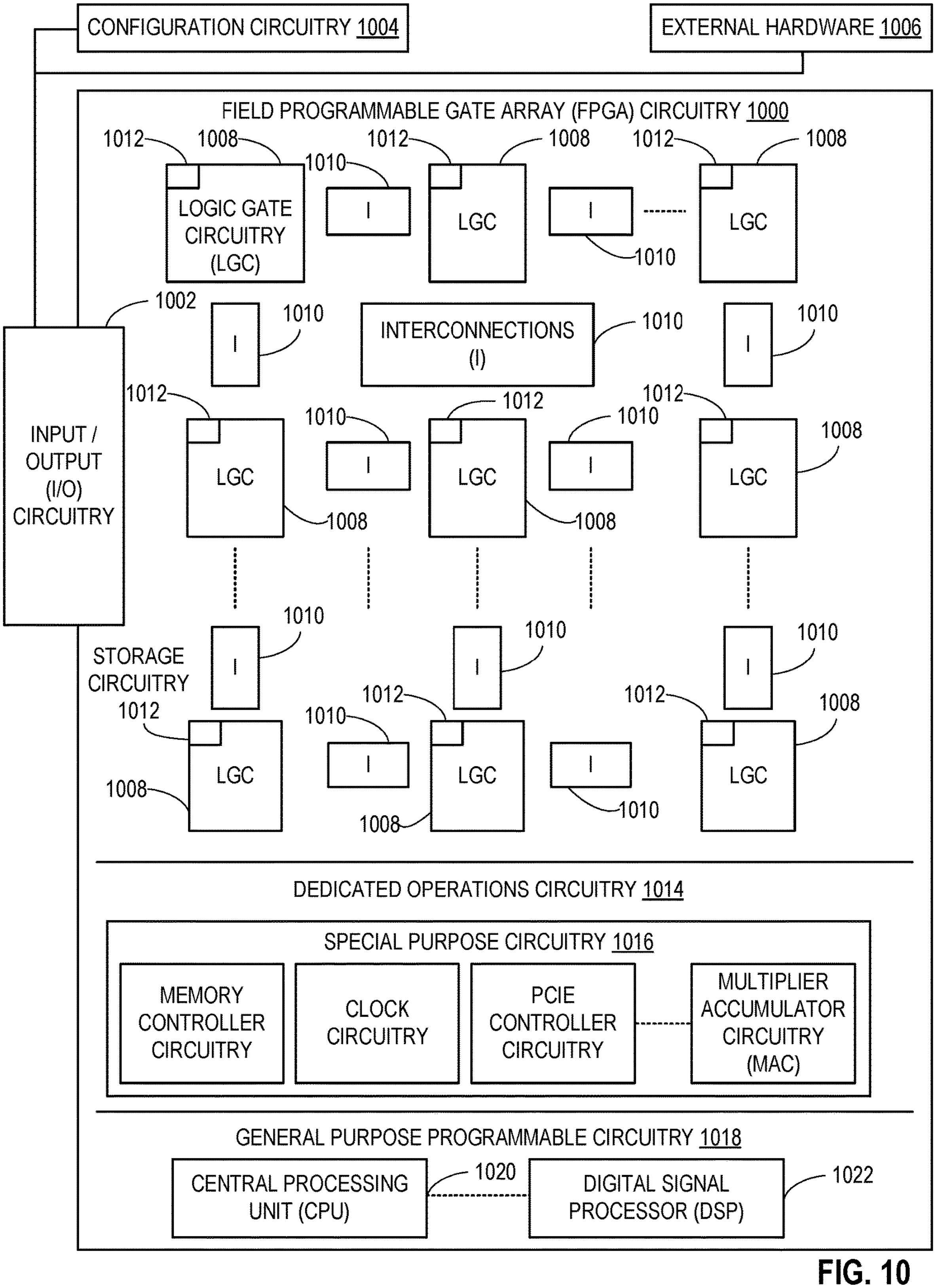
FIG. 10 is a block diagram of another example implementation of the processor circuitry of FIG. 8.

FIG. 10 is a block diagram of another example implementation of the processor circuitry 812 of FIG. 8. In this example, the processor circuitry 812 is implemented by FPGA circuitry 1000. For example, the FPGA circuitry 1000 may be implemented by an FPGA. The FPGA circuitry 1000 can be used, for example, to perform operations that could otherwise be performed by the example microprocessor 900 of FIG. 9 executing corresponding machine-readable instructions. However, once configured, the FPGA circuitry 1000 instantiates the machine-readable instructions in hardware and, thus, can often execute the operations faster than they could be performed by a general-purpose microprocessor executing the corresponding software.

More specifically, in contrast to the microprocessor 900 of FIG. 9 described above (which is a general-purpose device that may be programmed to execute some or all of the machine-readable instructions represented by the flowcharts of FIGS. 3, 4, 5, 6, and/or 7 but whose interconnections and logic circuitry are fixed once fabricated), the FPGA circuitry 1000 of the example of FIG. 10 includes interconnections and logic circuitry that may be configured and/or interconnected in different ways after fabrication to instantiate, for example, some or all of the machine-readable instructions represented by the flowcharts of FIGS. 3, 4, 5, 6, and/or 7. In particular, the FPGA circuitry 1000 may be thought of as an array of logic gates, interconnections, and switches. The switches can be programmed to change how the logic gates are interconnected by the interconnections, effectively forming one or more dedicated logic circuits (unless and until the FPGA circuitry 1000 is reprogrammed). The configured logic circuits enable the logic gates to cooperate in different ways to perform different operations on data received by input circuitry. Those operations may correspond to some or all of the software represented by the flowcharts of FIGS. 3, 4, 5, 6, and/or 7. As such, the FPGA circuitry 1000 may be structured to effectively instantiate some or all of the machine-readable instructions of the flowcharts of FIGS. 3, 4, 5, 6, and/or 7 as dedicated logic circuits to perform the operations corresponding to those software instructions in a dedicated manner analogous to an ASIC. Therefore, the FPGA circuitry 1000 may perform the operations corresponding to the some or all of the machine-readable instructions of FIGS. 3, 4, 5, 6, and/or 7 faster than the general-purpose microprocessor can execute the same.

In the example of FIG. 10, the FPGA circuitry 1000 is structured to be programmed (and/or reprogrammed one or more times) by an end user by a hardware description language (HDL) such as Verilog. The FPGA circuitry 1000 of FIG. 10, includes example input/output (I/O) circuitry 1002 to obtain and/or output data to/from example configuration circuitry 1004 and/or external hardware 1006. For example, the configuration circuitry 1004 may be implemented by interface circuitry that may obtain machine-readable instructions to configure the FPGA circuitry 1000, or portion(s) thereof. In some such examples, the configuration circuitry 1004 may obtain the machine-readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1006 may be implemented by external hardware circuitry. For example, the external hardware 1006 may be implemented by the microprocessor 900 of FIG. 9. The FPGA circuitry 1000 also includes an array of example logic gate circuitry 1008, a plurality of example configurable interconnections 1010, and example storage circuitry 1012. The logic gate circuitry 1008 and configurable interconnections 1010 are configurable to instantiate one or more operations that may correspond to at least some of the machine-readable instructions disclosed herein and/or other desired operations. The logic gate circuitry 1008 shown in FIG. 10 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1008 to enable configuration of the electrical structures and/or the logic gates to form circuits to perform desired operations. The logic gate circuitry 1008 may include other electrical structures such as look-up tables (LUTs), registers (e.g., flip-flops or latches), multiplexers, etc.

The configurable interconnections 1010 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1008 to program desired logic circuits.

The storage circuitry 1012 of the illustrated example is structured to store result(s) of the one or more of the operations performed by corresponding logic gates. The storage circuitry 1012 may be implemented by registers or the like. In the illustrated example, the storage circuitry 1012 is distributed amongst the logic gate circuitry 1008 to facilitate access and increase execution speed.

The example FPGA circuitry 1000 of FIG. 10 also includes example Dedicated Operations Circuitry 1014. In this example, the Dedicated Operations Circuitry 1014 includes special purpose circuitry 1016 that may be invoked to implement commonly used functions to avoid the need to program those functions in the field. Examples of such special purpose circuitry 1016 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1000 may also include example general-purpose programmable circuitry 1018 such as an example CPU 1020 and/or an example DSP 1022. Other general-purpose programmable circuitry 1018 may additionally or alternatively be present such as a GPU, an XPU, etc., that can be programmed to perform other operations.

Although FIGS. 9 and 10 illustrate two example implementations of the processor circuitry 812 of FIG. 8, many other approaches are contemplated. For example, as mentioned above, modern FPGA circuitry may include an on-board CPU, such as one or more of the example CPU 1020 of FIG. 10. Therefore, the processor circuitry 812 of FIG. 8 may additionally be implemented by combining the example microprocessor 900 of FIG. 9 and the example FPGA circuitry 1000 of FIG. 10. In some such hybrid examples, a first portion of the machine-readable instructions represented by the flowcharts of FIGS. 3, 4, 5, 6, and/or 7 may be executed by one or more of the cores 902 of FIG. 9, a second portion of the machine-readable instructions represented by the flowcharts of FIGS. 3, 4, 5, 6, and/or 7 may be executed by the FPGA circuitry 1000 of FIG. 10, and/or a third portion of the machine-readable instructions represented by the flowcharts of FIGS. 3, 4, 5, 6, and/or 7 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 812 of FIG. 8 may be in one or more packages. For example, the microprocessor 900 of FIG. 9 and/or the FPGA circuitry 1000 of FIG. 10 may be in one or more packages. In some examples, an XPU may be implemented by the processor circuitry 812 of FIG. 8, which may be in one or more packages. For example, the XPU may include a CPU in one package, a DSP in another package, a GPU in yet another package, and an FPGA in still yet another package.

Figure 11:
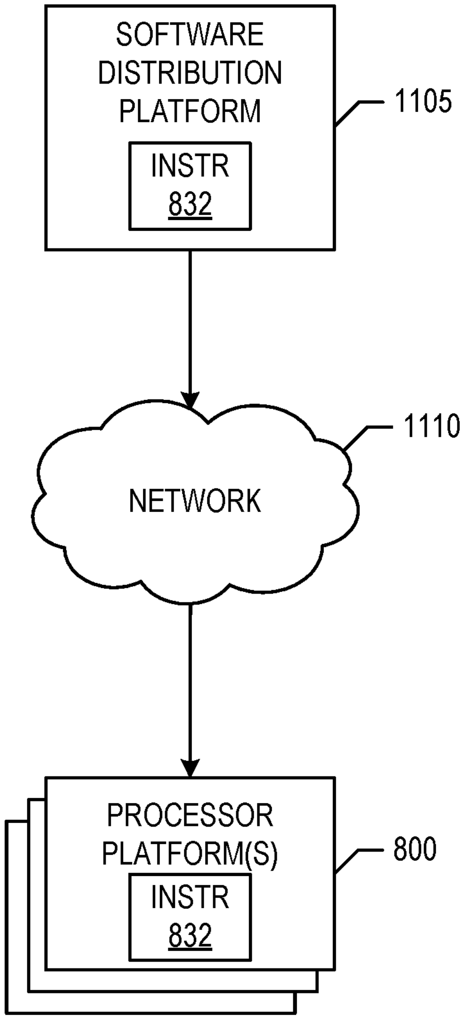
FIG. 11 is a block diagram of an example software distribution platform (e.g., one or more servers) to distribute software (e.g., software corresponding to example machine-readable instructions) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1105 to distribute software such as the example machine-readable instructions 832 of FIG. 8 to hardware devices owned and/or operated by third parties is illustrated in FIG. 11. The example software distribution platform 1105 may be implemented by any computer server, data facility, cloud service, etc., capable of storing and transmitting software to other computing devices. The third parties may be customers of the entity owning and/or operating the software distribution platform 1105. For example, the entity that owns and/or operates the software distribution platform 1105 may be a developer, a seller, and/or a licensor of software such as the example machine-readable instructions 832 of FIG. 8. The third parties may be consumers, users, retailers, OEMs, etc., who purchase and/or license the software for use and/or re-sale and/or sub-licensing. In the illustrated example, the software distribution platform 1105 includes one or more servers and one or more storage devices. The storage devices store the machine-readable instructions 832, which may correspond to the example machine-readable instructions and/or the example operations 300 of FIG. 3, the example machine-readable instructions and/or the example operations 400 of FIG. 4, the example machine-readable instructions and/or the example operations 500 of FIG. 5, the example machine-readable instructions and/or the example operations 600 of FIG. 6, and/or the example machine-readable instructions and/or the example operations 700 of FIG. 7, as described above. The one or more servers of the example software distribution platform 1105 are in communication with a network 1110, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third-party payment entity. The servers enable purchasers and/or licensors to download the machine-readable instructions 832 from the software distribution platform 1105. For example, the software, which may correspond to the example machine-readable instructions and/or the example operations 300 of FIG. 3, the example machine-readable instructions and/or the example operations 400 of FIG. 4, the example machine-readable instructions and/or the example operations 500 of FIG. 5, the example machine-readable instructions and/or the example operations 600 of FIG. 6, and/or the example machine-readable instructions and/or the example operations 700 of FIG. 7, may be downloaded to the example processor platform 800, which is to execute the machine-readable instructions 832 to implement the performance monitoring circuitry 102 of FIGS. 1 and/or 2. In some example, one or more servers of the software distribution platform 1105 periodically offer, transmit, and/or force updates to the software (e.g., the example machine-readable instructions 832 of FIG. 8) to ensure improvements, patches, updates, etc., are distributed and applied to the software at the end user devices.

From the foregoing, it will be appreciated that example systems, methods, apparatus, and articles of manufacture have been disclosed that determine the performance and integrity of audience metering devices using self-generated acoustic stimuli captured by built-in audio sensors. Example systems, methods, apparatus, and articles of manufacture have been disclosed that identify one or more defective components of a meter so that defective meters may be replaced with effective meters thereby improving monitoring efficiency.

Disclosed systems, methods, apparatus, and articles of manufacture improve the efficiency of using a computing device by routinely checking for errors in meters, diagnosing errors if present, and alerting entities that are to repair defective meters so as to reduce computational resource expenditure in connection with processing of data collected by defective meters. Disclosed systems, methods, apparatus, and articles of manufacture are accordingly directed to one or more improvement(s) in the operation of a machine such as a computer or other electronic and/or mechanical device.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to determine performance of an audience measurement meter, the apparatus comprising:
- at least one memory;
- machine-readable instructions; and
- processor circuitry to execute the machine-readable instructions to: cause an audio output device of the meter to emit an audio
- signal into an environment, the audio signal based on a test pattern including a first plurality of watermarks;
  - cause an audio input device of the meter to collect data from the environment during emission of the audio signal;
  - determine whether a second plurality of watermarks decoded from the data match the first plurality of watermarks; and
  - based on a difference between the first plurality of watermarks and the second plurality of watermarks indicative of a fault, cause an alert to be transmitted to a device associated with an audience measurement company that issued the meter.

2. The apparatus of claim 1, wherein the meter is disposed in the environment.

3. The apparatus of claim 1, wherein the first plurality of watermarks includes a first watermark and a second watermark, and the processor circuitry is to:
- cause the audio output device to emit the first watermark at a first frequency at a first time, the first watermark associated with a first fault; and
- cause the audio output device to emit the second watermark at a second frequency at a second time, the second watermark associated with a second fault.

4. The apparatus of claim 1, wherein the meter includes at least one of a portable meter or an in-home meter disposed in a viewing area and associated with a media presentation device.

5. The apparatus of claim 1, wherein the fault is a first fault, the alert is a first alert, and the processor circuitry is to:
- determine a metric of error between a first frequency representation of the data and a second frequency representation of the test pattern; and
- based on the metric of error satisfying a threshold indicative of a second fault, cause the alert to be transmitted to the device associated with the audience measurement company.

6. The apparatus of claim 5, wherein the alert is a first alert, the threshold is a first threshold, and the processor circuitry is to:
- determine whether an average value of the first frequency representation satisfies an ambient noise threshold; and
- cause a second alert to be transmitted to the device, the second alert to indicate that a candidate fault associated with the audio output device of the meter has been identified.

7. The apparatus of claim 5, wherein the alert is a first alert, and the processor circuitry is to:
- determine whether an average value of the first frequency representation is greater than zero; and
- cause a second alert to be transmitted to the device, the second alert to indicate that a candidate fault associated with the audio input device of the meter has been identified and that monitoring data reported by the meter is to be disregarded.

8. The apparatus of claim 1, wherein the fault includes at least one of (a) a defect in at least one of the audio input device or the audio output device or (b) an obstruction of the at least one of the audio input device or the audio output device.

9. The apparatus of claim 1, wherein the processor circuitry is to:
- in response to the second plurality of watermarks matching the first plurality of watermarks, increment a variable indicative of the fault; and
- in response to the variable satisfying a threshold, cause the alert to be transmitted to the device.

10. At least one non-transitory computer readable storage medium comprising instructions, that, when executed, cause processor circuitry to:
- cause an audio output device of a meter to emit an audio signal into an environment, the audio signal based on a test pattern including a first plurality of watermarks;
- cause an audio input device of the meter to collect data from the environment during emission of the audio signal;
- determine whether a second plurality of watermarks decoded from the data match the first plurality of watermarks; and
- based on a difference between the first plurality of watermarks and the second plurality of watermarks indicative of a fault, cause an alert to be transmitted to a device associated with an audience measurement company that issued the meter.

11. The at least one non-transitory computer readable storage medium of claim 10, wherein the meter is disposed in the environment.

12. The at least one non-transitory computer readable storage medium of claim 10, wherein the first plurality of watermarks includes a first watermark and a second watermark, and the instructions cause the processor circuitry to:
- cause the audio output device to emit the first watermark at a first frequency at a first time, the first watermark associated with a first fault; and
- cause the audio output device to emit the second watermark at a second frequency at a second time, the second watermark associated with a second fault.

13. The at least one non-transitory computer readable storage medium of claim 10, wherein the meter includes at least one of a portable meter or an in-home meter disposed in a viewing area and associated with a media presentation device.

14. The at least one non-transitory computer readable storage medium of claim 10, wherein the fault is a first fault, the alert is a first alert, and the instructions cause the processor circuitry to:

determine a metric of error between a first frequency representation of the data and a second frequency representation of the test pattern; and based on the metric of error satisfying a threshold indicative of a second fault, cause the alert to be transmitted to the device associated with the audience measurement company.

15. The at least one non-transitory computer readable storage medium of claim 14, wherein the alert is a first alert, the threshold is a first threshold, and the instructions cause the processor circuitry to:

determine whether an average value of the first frequency representation satisfies an ambient noise threshold; and cause a second alert to be transmitted to the device, the second alert to indicate that a candidate fault associated with the audio output device of the meter has been identified.

16. The at least one non-transitory computer readable storage medium of claim 14, wherein the alert is a first alert, and the instructions cause the processor circuitry to:

determine whether an average value of the first frequency representation is greater than zero; and cause a second alert to be transmitted to the device, the second alert to indicate that a candidate fault associated with the audio input device of the meter has been identified and that monitoring data reported by the meter is to be disregarded.

17. The at least one non-transitory computer readable storage medium of claim 10, wherein the fault includes at least one of (a) a defect in at least one of the audio input device or the audio output device or (b) an obstruction of the at least one of the audio input device or the audio output device.

18. The at least one non-transitory computer readable storage medium of claim 10, wherein the instructions cause the processor circuitry to:

in response to the second plurality of watermarks matching the first plurality of watermarks, increment a variable indicative of the fault; and in response to the variable satisfying a threshold, cause the alert to be transmitted to the device.

19. A method for determining performance of an audience measurement meter, the method comprising:

emitting, via an audio output device of the meter, an audio signal into an environment, the audio signal based on a test pattern including a first plurality of watermarks;

collecting, via an audio input device of the meter, data from the environment during emission of the audio signal;

determining, by executing an instruction with processor circuitry, whether a second plurality of watermarks decoded from the data match the first plurality of watermarks; and based on a difference between the first plurality of watermarks and the second plurality of watermarks indicative of a fault, transmitting an alert to a device associated with an audience measurement company that issued the meter.

20. The method of claim 19, wherein the meter is disposed in the environment.

* * * * *